(12) United States Patent
Choi et al.

(10) Patent No.: US 11,399,346 B2
(45) Date of Patent: Jul. 26, 2022

(54) METHOD AND APPARATUS FOR CONTROLLING UPLINK TRANSMISSION POWER BY TERMINAL FOR DUAL CONNECTIVITY IN WIRELESS COMMUNICATION SYSTEM

(71) Applicant: Samsung Electronics Co., Ltd., Gyeonggi-do (KR)

(72) Inventors: Seunghoon Choi, Gyeonggi-do (KR); Youngbum Kim, Gyeonggi-do (KR); Taehyoung Kim, Gyeonggi-do (KR); Jinyoung Oh, Gyeonggi-do (KR)

(73) Assignee: Samsung Electronics Co., Ltd

( * ) Notice: Subject to any disclaimer, the term of this patent is extended or adjusted under 35 U.S.C. 154(b) by 104 days.

(21) Appl. No.: 17/053,000

(22) PCT Filed: May 7, 2019

(86) PCT No.: PCT/KR2019/005401
§ 371 (c)(1),
(2) Date: Nov. 4, 2020

(87) PCT Pub. No.: WO2019/216612
PCT Pub. Date: Nov. 14, 2019

(65) Prior Publication Data
US 2021/0243700 A1    Aug. 5, 2021

(30) Foreign Application Priority Data

| May 11, 2018 | (KR) | 10-2018-0054527 |
| Nov. 2, 2018 | (KR) | 10-2018-0133477 |
| Nov. 9, 2018 | (KR) | 10-2018-0137298 |

(51) Int. Cl.
*H04W 52/14*    (2009.01)
*H04W 76/16*    (2018.01)
(Continued)

(52) U.S. Cl.
CPC ......... *H04W 52/146* (2013.01); *H04W 52/30* (2013.01); *H04W 52/48* (2013.01); *H04W 52/50* (2013.01); *H04W 76/16* (2018.02)

(58) Field of Classification Search
None
See application file for complete search history.

(56) References Cited

U.S. PATENT DOCUMENTS 10,897,741 B2 *   1/2021   Yi .................. H04W 52/34
2014/0050205 A1    2/2014   Ahn et al.
(Continued)

FOREIGN PATENT DOCUMENTS

| KR | 1020160053939 | 5/2016 |
| WO | WO2013048172 | 4/2013 |

(Continued)

OTHER PUBLICATIONS

3GPP TSG RAN WG1 Meeting 90bis R1-1717312 Prague, Czech Republic, Oct. 9-13, 2017 (Year: 2017).*

(Continued)

*Primary Examiner* — Alex Skripnikov
(74) *Attorney, Agent, or Firm* — The Farrell Law Firm, P.C.

(57) ABSTRACT

The present disclosure relates to a communication technique for convergence of IoT technology and a 5G communication system for supporting a higher data transfer rate beyond a 4G system, and a system therefor. The present disclosure can be applied to intelligent services (e.g., smart homes, smart buildings, smart cities, smart or connected cars, health care, digital education, retail business, and services associated with security and safety) on the basis of 5G communication technology and IoT-related technology. Disclosed are a method and an apparatus for controlling uplink-transmitted transmission power in a wireless communication system.

15 Claims, 12 Drawing Sheets

(51) Int. Cl.
    *H04W 52/30* (2009.01)
    *H04W 52/48* (2009.01)
    *H04W 52/50* (2009.01)

(56) References Cited

U.S. PATENT DOCUMENTS

| | | | |
|---|---|---|---|
| 2015/0031410 A1 | 1/2015 | Lim et al. | |
| 2015/0341864 A1 | 11/2015 | Yang et al. | |
| 2018/0279227 A1 | 9/2018 | Kim et al. | |
| 2019/0166565 A1* | 5/2019 | Gaal | H04L 5/001 |
| 2019/0281559 A1 | 9/2019 | Yi | |
| 2019/0320396 A1* | 10/2019 | Bagheri | H04W 52/146 |
| 2020/0037259 A1 | 1/2020 | Choi et al. | |

FOREIGN PATENT DOCUMENTS

| | | |
|---|---|---|
| WO | WO2013141647 | 9/2013 |
| WO | WO2014107050 | 7/2014 |
| WO | WO2017039167 | 3/2017 |
| WO | WO2018203610 | 11/2018 |

OTHER PUBLICATIONS

3GPP TSG-RAN WG1 #90bis R1-1717409 Prague, Czechia, Oct. 9-13, 2017 (Year: 2017).*
3GPP TSG RAN WG1 #90bis R1-1717693 Prague, Czech Republic, Oct. 9-13, 2017 (Year: 2017).*
3GPP TSG RAN WG1 Meeting 90bis R1-1717739 Prague, CZ, Oct. 9-13, 2017 (Year: 2017).*
3GPP TSG RAN WG1 Meeting 90bis R1-1717983 Prague, CZ, Oct. 9-13, 2017 (Year: 2017).*
3GPP TSG RAN WG1 Meeting 90bis R1-1718366 Prague, CZ, Oct. 9-13, 2017 (Year: 2017).*
3GPP TSG RAN WG1 Meeting #90bis R1-1718903 Prague, Czech Republic Oct. 9-13, 2017 (Year: 2017).*
LG Electronics, "Discussion on Dynamic Power Sharing with sTTI for DC", R1-1800392, 3GPP TSG RAN WG1 NR AH1801, Jan. 22-26, 2018, 4 pages.
LG Electronics, "Discussion on Further Details on Dynamic Power Sharing for LTE-NR DC", R1-1717984, 3GPP TSG RAN WG1 Meeting 90bis, Oct. 9-13, 2017, 3 pages.
Interdigital Inc., Pcmax for LTE-NR DC in Sub-6Ghz (FR1), R4-1710165, TSG-RAN Working Group 4 (Radio) Meeting #84bis, Sep. 18-21, 2017, 5 pages.
European Search Report dated May 4, 2021 issued in counterpart application No. 19798865.2-1205, 11 pages.
PCT/ISA/210 Search Report issued on PCT/KR2019/005401, dated Aug. 8, 2019, pp. 7.
PCT/ISA/237 Written Opinion issued on PCT/KR2019/005401, dated Aug. 8, 2019, pp. 6.

* cited by examiner

METHOD AND APPARATUS FOR CONTROLLING UPLINK TRANSMISSION POWER BY TERMINAL FOR DUAL CONNECTIVITY IN WIRELESS COMMUNICATION SYSTEM

PRIORITY

This application is a National Phase Entry of PCT International Application No. PCT/KR2019/005401 which was filed on May 7, 2019, and claims priority to Korean Patent Application Nos. 10-2018-0054527, 10-2018-0133477 and 10-2018-0137298, which were filed on May 11, 2018, Nov. 2, 2018 and Nov. 9, 2018, respectively, the content of each of which is incorporated herein by reference.

TECHNICAL FIELD

The disclosure relates to a method and an apparatus for controlling transmission power for uplink transmission in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Meanwhile, various studies on an uplink control channel transmission scheme in a communication system have been made, and in particular, a physical uplink control channel (PUCCH) transmission scheme has been discussed at various angles.

DETAILED DESCRIPTION OF INVENTION

Technical Problem

A terminal capable of performing dual connectivity to LTE and NR may transmit or receive data for LTE and NR cells, respectively. Here, the uplink transmission power of the terminal is limited by the maximum power of the terminal.

Accordingly, an aspect of the disclosure is to provide a method and an apparatus for uplink transmission power control, such as reducing uplink transmission power or dropping transmissions in a particular cell, according to whether an LTE cell is a master cell group (MCG) or an NR cell is the MCG, or according to the processing time of uplink transmission of a terminal, in a case where uplink transmission occurs simultaneously in the LTE cell and the NR cell.

Solution to Problem

In order to solve the above problems, a method by a terminal for performing dual connectivity with a first base station based on a first radio access technology and a second base station based on a second radio access technology in a wireless communication system according to an embodiment of the disclosure may include: receiving, from the first base station, a downlink signal; identifying whether a first time resource for a transmission of a first uplink signal corresponding to the downlink signal overlaps a second time resource for a transmission of a second uplink signal which is transmitted to the second base station; identifying whether a sum of first transmission power for the transmission of the first uplink signal and second transmission power for the transmission of the second uplink signal exceeds a maximum transmission power of the terminal, in case that the transmission timing of the first uplink signal overlaps the transmission timing of the second uplink signal; and controlling the second transmission power based on a processing time for the transmission of the first uplink signal, in case that the sum exceeds the maximum transmission power of the terminal.

Further, a method by a first base station for supporting a dual connectivity for a terminal between the first base station based on a first radio access technology and a second base station based on a second radio access technology in a wireless communication system according to an embodiment of the disclosure may include: transmitting, to the terminal, a downlink signal; and receiving, from the terminal, a first uplink signal corresponding to the downlink signal based on first transmission power, wherein, in case that a transmission timing of the first uplink signal overlaps a transmission timing of a second uplink signal which is transmitted from the terminal to the second base station, and a sum of the first transmission power and second transmission power which is used for the transmission of the second uplink signal exceeds a maximum transmission power of the terminal, second transmission power is controlled based on a processing time of the first uplink signal of the terminal.

In addition, a terminal for performing dual connectivity with a first base station based on a first radio access technology and a second base station based on a second radio access technology in a wireless communication system according to an embodiment of the disclosure may include: a transceiver; and a controller configured to: control the transceiver to receive, from the first base station, a downlink signal; identify whether a first time resource for a transmission of a first uplink signal corresponding to the downlink signal overlaps a second time resource for a transmission of a second uplink signal which is transmitted to the second base station; identify whether a sum of first transmission power for the transmission of the first uplink signal and second transmission power for the transmission of the second uplink signal exceeds a maximum transmission power of the terminal, in case that the transmission timing of the first uplink signal overlaps the transmission timing of the second uplink signal; and control the second transmission power based on a processing time for the transmission of the first uplink signal, in case that the sum exceeds the maximum transmission power of the terminal.

In addition, a first base station for supporting dual connectivity for a terminal between the first base station based on a first radio access technology and a second base station based on a second radio access technology in a wireless communication system according to an embodiment of the disclosure may include: a transceiver; and a controller configured to control the transceiver to transmit, to the terminal, a downlink signal, and receive, from the terminal, a first uplink signal corresponding to the downlink signal based on first transmission power, wherein, in case that a transmission timing of the first uplink signal overlaps a transmission timing of a second uplink signal which is transmitted from the terminal to the second base station, and a sum of the first transmission power and second transmission power which is used for the transmission of the second uplink signal exceeds a maximum transmission power of the terminal, second transmission power is controlled based on a processing time of the first uplink signal of the terminal.

Advantageous Effects of Invention

According to an embodiment of the disclosure, when a terminal for which dual connectivity is supported receives configuration of dual connectivity from an LTE base station and an NR base station, uplink transmission can be performed by controlling transmission power to be within the maximum transmission power value by considering whether an LTE cell is an MCG or an NR cell is an MCG and an uplink processing time of a terminal, even if uplink transmission occurs simultaneously in the LTE cell and the NR cell.

MODE FOR THE INVENTION

Figure 1:
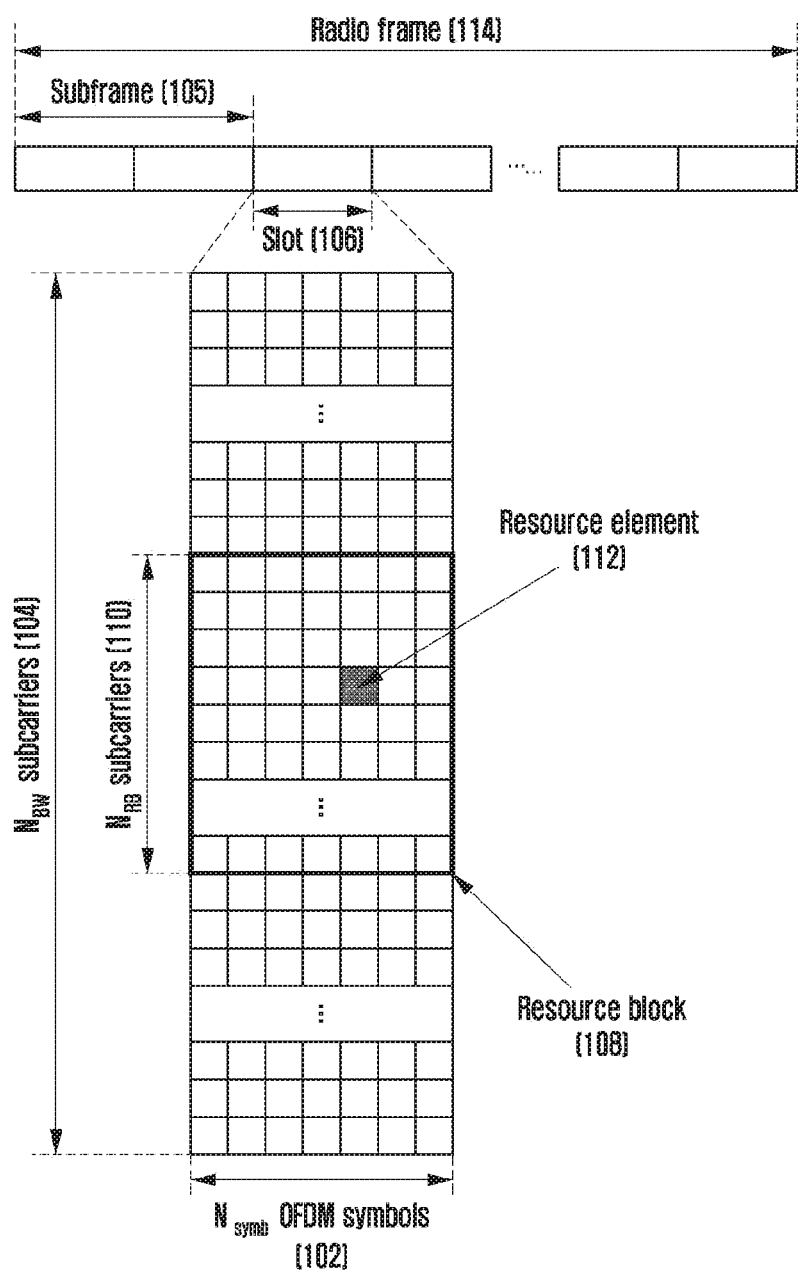
FIG. 1 illustrates a basic structure of a time-frequency domain in an LTE system.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Further, the detailed description of embodiments of the disclosure will be directed to OFDM-based mobile communication systems, in particular, the 3GPP EUTRA standards, but based on determinations by those skilled in the art, the main idea of the disclosure may also be applied to other communication systems having similar technical backgrounds or channel types through some modifications without significantly departing from the scope of the disclosure.

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Meanwhile, research on the coexistence of a new 5G communication (or referred to as NR communication in the disclosure) and the existing LTE communication in the same spectrum in a mobile communication system is underway.

The disclosure relates to a wireless communication system, and more particularly, to a method and an apparatus for transmitting or receiving data to or from each communication system by a terminal capable of transmitting or receiving data in at least one communication system among different communication systems, wherein different wireless communication systems coexist at one carrier frequency or multiple carrier frequencies.

In general, a mobile communication system has been developed to provide a voice service while guaranteeing user activity. However, the mobile communication system is gradually expanding not only to a voice service area but also a data service area, and now has evolved to provide high-speed data services. However, in the mobile communication system in which a service is currently provided, a shortage of resources and users demand faster services, and thus, a more advanced mobile communication system is required.

In response to these demands, one of the systems being developed as a next-generation mobile communication system, a specification work for long term evolution (LTE) is underway in the 3rd generation partnership project (3GPP). LTE is a technology that implements high-speed packet-based communication having a transmission rate of up to 100 Mbps. To this end, various methods are discussed. For example, the network structure can be simplified to reduce the number of nodes located on the communication path, or the wireless protocols can be as close to the wireless channel as possible.

The LTE system adopts a hybrid automatic repeat reQuest (HARQ) scheme in which a physical layer retransmits data when a decoding failure occurs in an initial transmission. In the HARQ scheme, when a receiver fails to correctly decode data, a receiver transmits information indicating the decoding failure (negative acknowledgment (NACK)) to a transmitter, and thus the transmitter may retransmit the corresponding data in the physical layer. The receiver combines the data retransmitted by the transmitter with data that has not been decoded previously, thereby improving data reception performance. In addition, when the receiver correctly decodes the data, an acknowledgment (ACK) indicating the decoding success is transmitted to the transmitter so that the transmitter may transmit new data.

FIG. 1 illustrates the basic structure of a time-frequency domain, that is, a radio resource domain, in which data or control information is transmitted in a downlink of an LTE system.

Referring to FIG. 1, the horizontal axis represents the time domain and the vertical axis represents the frequency domain. A minimum transmission unit in the time domain is an OFDM symbol, in which one slot 106 is configured by collecting Nsymb OFDM symbols 102 and one subframe 105 is configured by collecting two slots. The length of the slot is 0.5 ms and the length of the subframe is 1.0 ms. In addition, a radio frame 114 is a time domain unit which includes 10 subframes. The minimum transmission unit in the frequency domain is a subcarrier, in which the entire system transmission bandwidth includes a total of NBW subcarriers 104.

The basic unit of resources in the time-frequency domain is a resource element (RE) 112, and may be represented by an OFDM symbol index and a subcarrier index. A resource block (RB) (or a physical resource block (PRB)) 108 may be defined by Nsymb consecutive OFDM symbols 102 in the time domain and NRB consecutive subcarriers 110 in the frequency domain. Accordingly, one RB 108 may include Nsymb×NRB REs 122. Generally, the minimum transmission unit of data is the RB unit. In the LTE system, generally, Nsymb=7 and NRB=12, and NBW and NRB may be proportional to the bandwidth of the system transmission band.

The data rate is increased in proportion to the number of RBs scheduled for the terminal. The LTE system may define and operate six transmission bandwidths. In a frequency division duplex (FDD) system, which operates the downlink and the uplink separated in the frequency domain, a downlink transmission bandwidth and an uplink transmission bandwidth may be different from each other. The channel bandwidth represents a radio frequency (RF) bandwidth, which corresponds to the system transmission bandwidth.

<Table 1> below shows the correspondence relationship between the system transmission bandwidth and channel bandwidth defined in the LTE system. For example, in an LTE system having a channel bandwidth of 10 MHz, a transmission bandwidth may include 50 RBs.

TABLE 1

| Channel bandwidth $BW_{channel}$ [MHz] | 1.4 | 3 | 5 | 10 | 15 | 20 |
|---|---|---|---|---|---|---|
| Transmission bandwidth configuration | 6 | 15 | 25 | 50 | 75 | 100 |

Downlink control information may be transmitted within the first N OFDM symbols within the subframe. In general, N={1, 2, 3}. Accordingly, the value of N may vary for each subframe according to the amount of control information that needs to be transmitted to the current subframe. The control information includes a control channel transmission section indicator, indicating the number of OFDM symbols in which the control information is transmitted, scheduling information for downlink data or uplink data, and an HARQ ACK/NACK signal.

In the LTE system, scheduling information of downlink data or uplink data is delivered from a base station to a terminal through downlink control information (DCI). Uplink (UL) denotes a radio link through which the terminal transmits data or control signals to the base station, and downlink (DL) denotes a radio link through which the base station transmits data or control signals to the terminal. The DCI may be defined depending on various formats. A determined DCI format is applied and operated according to whether the DCI is scheduling information (UL grant) of the uplink data or scheduling information (DL grant) of the downlink data, whether the DCI is compact DCI having small-sized control information, whether to apply spatial multiplexing using multiple antennas, whether the DCI is DCI for power control, and the like. For example, DCI format 1, which is the scheduling control information (DL grant) of the downlink data, may include at least one piece of information among the following pieces of control information.

Resource allocation type 0/1 flag: notifies of whether a resource allocation scheme is type 0 or type 1. Type 0 applies a bitmap scheme so as to allocate resources in units of resource block groups (RBGs). In the LTE system, the basic unit of scheduling is an RB, represented by a time-frequency domain resource, and an RBG includes multiple RBs, and thus becomes a basic unit of scheduling in the type 0 scheme. Type 1 allocates a certain RB within an RBG.

Resource block assignment: notifies of an RB allocated to data transmission. A resource to be represented is determined according to the system bandwidth and a resource allocation scheme.

Modulation and coding scheme (MCS): notifies of the modulation scheme used for data transmission and the size of a transport block (TB), that is, the data to be transmitted.

HARQ process number: notifies of a HARQ process number.

New data indicator: notifies of whether it is a HARQ initial transmission or retransmission.

Redundancy version: notifies of the redundancy version of HARQ.

Transmission power control (TPC) command for physical uplink control channel (PUCCH): notifies of a transmission power control command for a PUCCH, which is an uplink control channel.

The DCI may be subjected to a channel coding and modulation process, and may then be transmitted through a physical downlink control channel (PDCCH) or an enhanced PDCCH (EPDCCH).

Generally, the DCI is independently channel-coded for each terminal, and is then configured as independent PDCCH and transmitted. In the time domain, the PDCCH is mapped and then transmitted during the control channel transmission section. The mapping location in the frequency domain of the PDCCH may be determined based on an identifier of each terminal and distributed over the entire system transmission bandwidth.

The downlink data may be transmitted through a physical downlink shared channel (PDSCH), which is a physical channel for downlink data transmission. The PDSCH may be transmitted after the control channel transmission section, and scheduling information of a detailed mapping location in the frequency domain, a modulation scheme, or the like may be indicated by the DCI transmitted through the PDCCH.

Through MCS configured by 5 bits, among pieces of control information configuring the DCI, a base station provides notification of the modulation scheme applied to a PDSCH to be transmitted to a terminal and the size of data (transport block size (TBS)) to be transmitted. The TBS corresponds to a size before channel coding for error correction is applied to a data transport block (TB) to be transmitted by the base station.

Modulation schemes supported by the LTE system include quadrature phase shift keying (QPSK), 16 quadrature amplitude modulation (QAM), and 64QAM, modulation orders Qms of which correspond to 2, 4, and 6, respectively. That is, in the case of QPSK modulation, 2 bits per symbol may be transmitted, in the case of 16QAM modulation, 4 bits per symbol may be transmitted, and in the case of 64QAM modulation, 6 bits per symbol may be transmitted.

In 3GPP LTE Rel-10, bandwidth extension technology has been adopted to support higher data throughput compared to LTE Rel-8. This technique, called bandwidth extension or carrier aggregation (CA), can increase the amount of data transmission by an extended band compared to an LTE Rel-8 terminal that transmits data in one band by extending the band. Each of the bands is called a component carrier (CC), and the LTE Rel-8 terminal is defined to have one component carrier for each of downlink and uplink. In addition, a downlink component carrier and an uplink component carrier connected to the downlink component carrier via SIB-2 are collectively called a cell. The SIB-2 connection relationship between the downlink component carrier and the uplink component carrier is transmitted via a system signal or a higher layer signal. The terminal supporting the CA may receive downlink data through a plurality of serving cells and transmit uplink data.

In Rel-10, when it is difficult for a base station to transmit a physical downlink control channel (PDCCH) in a specific serving cell to a specific terminal, the PDCCH is transmitted in another serving cell. In addition, as a field indicating that the corresponding PDCCH indicates a physical downlink shared channel (PDSCH) or a physical uplink shared channel (PUSCH) of another serving cell, a carrier indicator field (CIF) may be configured for the terminal. The CIF may be configured for a terminal supporting the CA. The CIF is determined to indicate another serving cell by adding 3 bits to the PDCCH information in a specific serving cell. The CIF is included only when the CIF is configured via a higher layer signal to perform cross carrier scheduling. If the higher layer signal is not configured for cross carrier scheduling or the higher layer signal is configured for self-scheduling, CIF is not included and cross carrier scheduling is not performed at this time. When the CIF is included in downlink allocation information (DL assignment), the CIF indicates a serving cell to which a PDSCH scheduled by DL assignment is to be transmitted. In addition, when the CIF is included in UL resource allocation information (UL grant), the CIF is defined to indicate the serving cell to which the PUSCH scheduled by the UL grant is to be transmitted.

As described above, in LTE Rel-10, carrier aggregation (CA), which is a bandwidth extension technology, is defined, and a plurality of serving cells may be configured in the terminal. The terminal transmits channel information about the plurality of serving cells periodically or a periodically to the base station for data scheduling of the base station. The base station schedules and transmits data for each carrier, and the terminal transmits A/N feedback for the data transmitted for each carrier. In LTE Rel-10, it is designed to transmit A/N feedback of a maximum of 21 bits, and when A/N feedback and channel information transmission overlap in one subframe, it is designed to transmit A/N feedback and discard channel information. In LTE Rel-11, up to 22 bits of A/N feedback and one cell channel information are transmitted to PUCCH format 3 in a PUCCH format 3 transmission resource by multiplexing channel information of one cell with A/N feedback.

In LTE Rel-13, a maximum of 32 serving cell configuration scenarios are assumed. The concept of extending the number of serving cells to 32 by using a band in an unlicensed band as well as a licensed band is completed. In addition, in consideration of the limited number of licensed bands such as the LTE frequency, the LTE service has been provided in an unlicensed band such as the 5 GHz band, which is called licensed assisted access (LAA). The LAA applies carrier aggregation technology in LTE to support the operation of the LTE cell, which is a licensed band, as the P-cell, and the LAA cell, which is the unlicensed band, as the Scell. Therefore, as in LTE, feedback generated in the LAA cell, which is the SCell, should be transmitted only in the Pcell, and the LAA cell may be freely applied with the downlink subframe and the uplink subframe. Unless described otherwise in this specification, LTE refers to including all of LTE evolution technology, such as LTE-A and LAA.

On the other hand, a communication system after LTE, i.e., a fifth generation wireless cellular communication system (hereinafter referred to as 5G or NR), should be able to freely reflect various requirements such as users and service providers such that services that meet the requirements can be supported.

Thus, 5G may be defined as a technology for satisfying requirements, selected for each of various 5G-oriented services such as enhanced mobile broadband communication (hereinafter referred to as eMBB in the specification), massive machine type communication (hereinafter referred to as mMTC in the specification), and ultra-reliable and low-latency communication (hereinafter referred to as URLLC in the specification), among requirements such as terminal maximum transmission speed of 20 Gbps, terminal maximum speed of 500 km/h, and maximum delay time of 0.5 ms, and terminal access density of 1,000,000 terminals/km$^2$.

For example, in order to provide eMBB in 5G, it is necessary to provide a terminal maximum transmission rate of 20 Gbps in downlink and a terminal maximum transmission rate of 10 Gbps in uplink from one base station perspective. At the same time, the actual transmission rate that the terminal can actually experience should also be increased. In order to meet these requirements, improvements in transmission or reception techniques are required, including more advanced multiple-input multiple output transmission techniques.

At the same time, mMTC is being considered to support application services such as the Internet of Things (IoT) in 5G. In order to efficiently provide the Internet of Things, mMTC needs a requirement for supporting large terminal access in a cell, enhancement of terminal coverage, improved battery time, and cost reduction of terminals. Since the IoT is attached to various sensors and various devices to provide a communication function, it needs to be able to support a large number of terminals (e.g., 1,000,000 terminals/km$^2$) in a cell. In addition, because of the nature of the service, mMTC is required to have a wider coverage than coverage provided by an eMBB because a terminal is likely to be located in a shadow area such as the basement of a building or an area not covered by a cell. Since mMTC is likely to be configured as a low-cost terminal and it is difficult to frequently change the battery of the terminal, very long battery life time is required.

Finally, in the case of URLLC, cellular-based wireless communication used for a specific purpose is a service used for remote control of robots or mechanical devices, industrial automation, unmanned aerial vehicles, remote health control, emergency notification, etc. In addition, the service must provide communications that provide ultra-low latency and ultra-reliability. For example, URLLC needs to satisfy a maximum latency of less than 0.5 ms, while simultaneously providing a packet error rate of 10-5 or less. Accordingly, a transmission time interval (TTI) smaller than a 5G service such as eMBB is required for URLLC, and a design that can allocate a wide resource in a frequency band is required.

The services considered in the above-mentioned fifth generation wireless cellular communication system should be provided as one framework. That is, for efficient resource management and control, it is desirable that each service is integrated into one system, controlled, and transmitted rather than operated independently.

Figure 2:
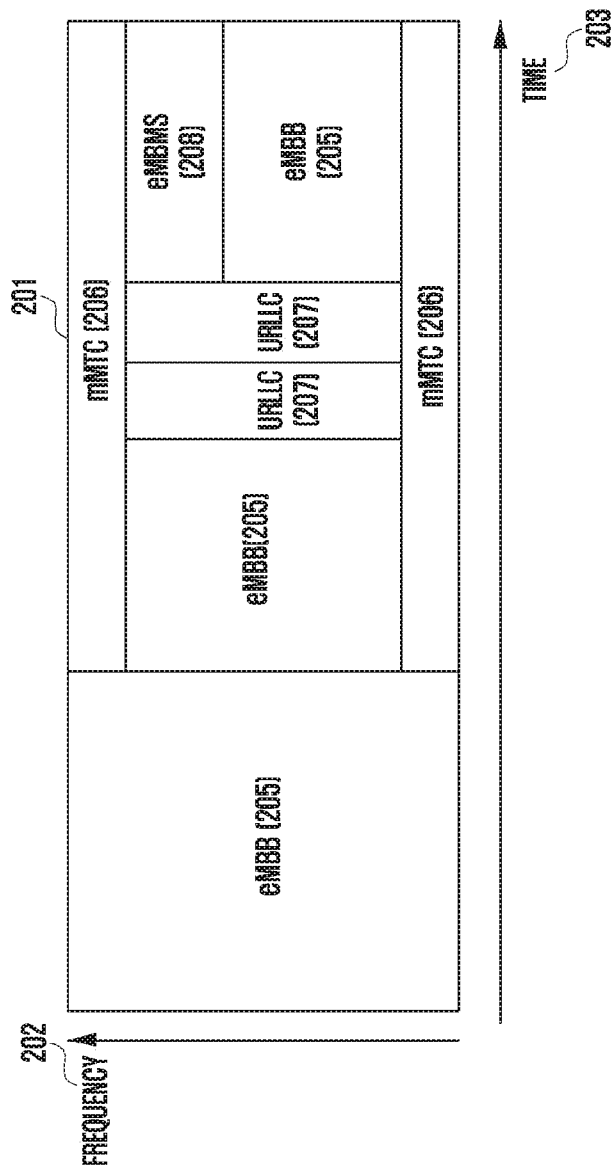
FIG. 2 illustrates an example in which 5G services are multiplexed in one system and transmitted.

FIG. 2 illustrates an example in which services considered in 5G are transmitted to one system.

In FIG. 2, a frequency-time resource 201 used by 5G may be configured by a frequency axis 202 and a time axis 203. FIG. 2 illustrates that 5G operates eMBB 205, mMTC 206, and URLLC 207 within one framework. In addition, as an additional service that can be considered in 5G, an enhanced mobile broadcast/multicast service (eMBMS) 208 for providing a broadcasting service on a cellular basis may be considered.

Services considered in 5G, such as eMBB 205, mMTC 206, URLLC 207 and eMBMS 208, may be multiplexed through time-division multiplexing (TDM) or frequency-division multiplexing (FDM) and transmitted, and spatial division multiplexing may also be considered. In the case of the eMBB 205, it is preferable to occupy the maximum frequency bandwidth and transmit at a specific predetermined time in order to provide the above-mentioned increased data transmission rate. Therefore, the eMBB 205 service may be transmitted after being TDMed with other services within a system transmission bandwidth 201. However, according to the needs of other services, the eMBB 205 may be transmitted after being FDMed with other services within the system transmission bandwidth.

In the case of the mMTC 206, unlike other services, an increased transmission interval is required in order to secure a wide coverage. Coverage may be secured by repeatedly transmitting the same packet within a transmission interval. At the same time, in order to reduce the complexity of a terminal and the price of the terminal, the transmission bandwidth within which the terminal is capable of performing reception may be limited. By taking into consideration the above-described requirements, the mMTC 206 may be frequency-division multiplexed with other services and transmitted within the transmission system bandwidth 201 of 5G.

The URLLC 207 may have a transmit time interval (TTI) shorter than those of other services in order to realize the ultra-low-latency requirement that the service requires. At the same time, since a low coding rate is needed in order to satisfy the ultra-high-reliability requirement, the URLLC 207 may have a wide frequency bandwidth. By taking into consideration the above-described requirements, the URLLC 207 may be time-division multiplexed with other services within the transmission system bandwidth 201 of 5G.

The above-described services may have different transmission/reception schemes and transmission/reception parameters in order to satisfy the requirements of each service. For example, each service may have a different numerology for each service requirement. Here, the numerology may include a cyclic prefix (CP) length, subcarrier spacing, an OFDM symbol length, a transmit time interval (TTI), and the like in a communication system based on orthogonal frequency-division multiplexing (OFDM) or orthogonal frequency-division multiple access (OFDMA). For example, the services may have different numerologies, and the eMBMS 208 may have a CP length longer than that of other services. The eMBMS 208 may transmit broadcast-based higher layer traffic, and thus may transmit the same data in all cells.

Here, from the perspective of a terminal, if signals received in a plurality of cells are received within a CP length, the terminal may receive and decode all of the signals. Accordingly, the terminal may obtain a single frequency network (SFN) diversity gain, and even if the terminal is located at a cell boundary, the terminal may receive broadcasting information without coverage restraint. However, in a case where 5G supports eMBMS, if the CP length is longer than those of other services, waste due to CP overhead may occur. Accordingly, an OFDM symbol length longer than that of other services is required, and at the same time, subcarrier spacing narrower than those of other services may be required.

Further, as an example in which different numerologies are used between services in 5G, in the case of URLLC, a shorter OFDM symbol length may be required as a smaller TTI is required than other services, and at the same time, a wider subcarrier interval may be required.

Meanwhile, in 5G, one TTI may be defined as one slot, and may include 14 OFDM symbols or 7 OFDM symbols. Therefore, in the case of subcarrier spacing of 15 KHz, one slot has a length of 1 ms or 0.5 ms. In addition, in 5G, one TTI may be defined as one mini-slot or a sub-slot for emergency transmission and transmission to unlicensed band, and one mini-slot may include one OFDM symbol or n OFDM symbols, where n is obtained by subtracting 1 from the total number of OFDM symbols of a slot. For example, when the length of one slot is 14 OFDM symbols, the length of the mini-slot may be determined as one of 1 to 13 OFDM symbols. The length, format, and repetition type of the slot or mini-slot may be defined by the standard or transmitted by higher layer signals, system information, or physical signals, and may be received by the terminal. In addition, instead of a mini-slot or a sub-slot, a slot may be determined as one of 1 to 14 OFDM symbols, and the length of the slot may be transmitted by a higher layer signal or system information and may be received by the terminal.

Slots or mini-slots may be defined to have various transmission formats, and may be classified into the following formats.

Downlink-dedicated slot (DL only slot or full DL slot): a downlink-dedicated slot includes only a downlink section and supports only downlink transmission.

Downlink (DL) centric slot: a DL centric slot includes a downlink section, a GP (or a flexible symbol), and an uplink section, and the number of OFDM symbols in the downlink section is greater than the number of OFDM symbols in the uplink section.

Uplink (UL) centric slot: an up-centric slot includes a downlink section, a GP (or flexible symbol), and an uplink section, and the number of OFDM symbols in the downlink section is smaller than the number of OFDM symbols in the uplink section.

Uplink-dedicated slot (UL only slot or full UL slot): an uplink-dedicated slot includes only an uplink section and supports only uplink transmission.

In the above, although only the slot format is classified, the mini-slot may be classified according to the same classification method. That is, the mini-slot may be classified into a downlink-dedicated mini slot, a downlink centric mini slot, an uplink centric mini slot, an uplink-dedicated mini slot, and the like. The flexible symbol may be used as a guard symbol for transmission/reception switching or may also be used for channel estimation purposes.

Hereinafter, exemplary embodiments of the disclosure will be described in detail with reference to the accompanying drawings. Here, it should be noted that the same elements are denoted by the same reference numerals where possible. In addition, detailed descriptions of known functions and configurations that may obscure the subject matter of the disclosure will be omitted.

In addition, in describing the embodiments of the disclosure in detail, the LTE and 5G systems will be the main target. However, the main subject matter of the disclosure can be applied to other communication systems having a similar technical background and channel type through slight modifications within the scope that does not significantly depart from the scope of the disclosure. This will be possible by the determination of those skilled in the art of the disclosure.

Hereinafter, a 5G system for transmitting or receiving data in the 5G cell will be described.

Figure 3:
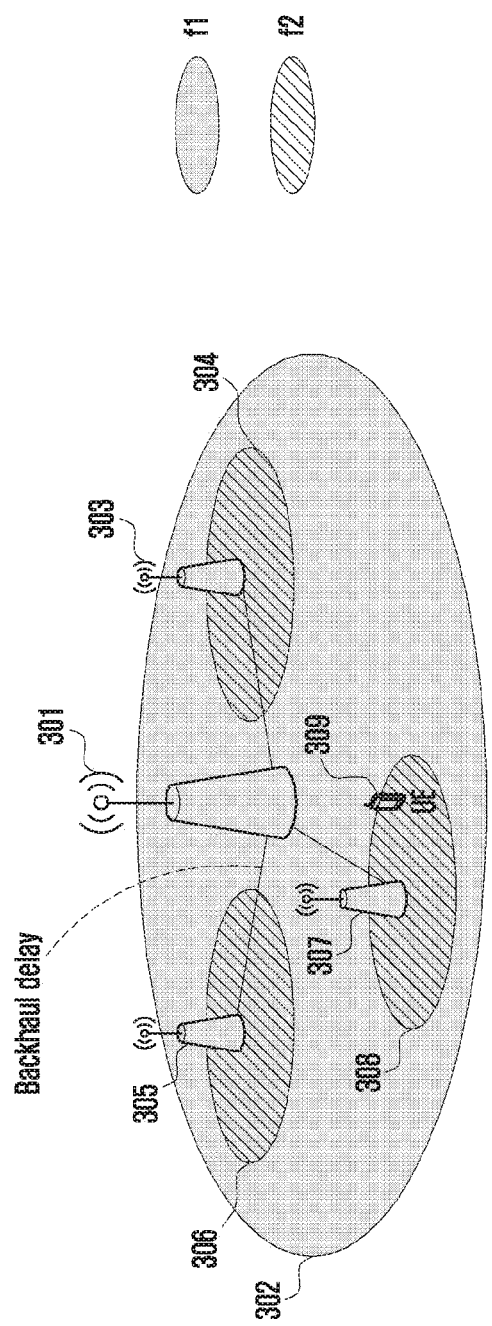
FIG. 3 illustrates an embodiment of a communication system to which the disclosure is applied.

FIG. 3 illustrates an embodiment of a communication system to which the disclosure is applied. The figures illustrate an aspect in which the 5G system is operated, and the methods proposed in the disclosure can be applied to the system of FIG. 3.

FIG. 3 illustrates an example of an integrated system configuration obtained by combining a base station in charge of the new radio access technology and an LTE/LTE-A base station.

Referring to FIG. 3, small base stations 303, 305, and 307 having relatively small coverages 304, 306, and 308 may be disposed within coverage 302 of a macro base station 301. In general, the macro base station 301 is capable of transmitting signals at a relatively higher transmission power than the small base stations 303, 305, and 307, and thus the coverage 302 of the macro base station 301 is relatively greater than the coverages 304, 306, and 308 of the small base stations 303, 305, and 307. In the example of FIG. 3, the macro base station indicates an LTE/LTE-A system operating in a relatively low frequency band, and the small base stations 303, 305, and 307 indicate a system to which a new radio access technology (NR or 5G) operating in the relatively high frequency band is applied.

The macro base station 301 and the small base station 303, 305, 307 are interconnected, and there may be a predetermined amount of backhaul delay depending on a connection state. Therefore, it may not be desirable to exchange information that is sensitive to transmission delays between the macro base station 301 and the small base stations 303, 305, and 307.

Meanwhile, the example of FIG. 3 illustrates carrier combination between the macro base station 301 and the small base stations 303, 305, and 307. However, the disclosure is not limited thereto, and may be applicable to carrier combination between base stations located at different locations. For example, according to embodiments, the disclosure may be applicable to both carrier combination between macro base stations located at different locations and carrier combination between small base stations located at different locations. In addition, the number of combined carriers is not limited.

Referring to FIG. 3, the macro base station 301 may use frequency f1 for downlink signal transmission, and the small base stations 303, 305, and 307 may use frequency f2 for downlink signal transmission. In this case, the macro base station 301 may transmit data or control information to a predetermined terminal 309 via frequency f1, and the small base stations 303, 305, and 307 may transmit data or control information via frequency f2. Through such a carrier combination, a base station adopting a new radio access technology capable of supporting ultra-wideband in a high frequency band provides an ultra-high speed data service and an ultra-low latency service. At the same time, a base station having adopted LTE/LTE-A technology in a relatively low frequency band may support a stable mobility of a terminal.

Meanwhile, the configuration illustrated in FIG. 3 may be similarly applied to uplink carrier combination as well as downlink carrier combination. For example, the terminal 309 may transmit data or control information to the macro base station 301 via frequency f1' for uplink signal transmission. In addition, the terminal 309 may transmit data or control information to the small base stations 303, 305, and 307 via frequency f2' for uplink signal transmission. The f1' may correspond to the f1, and the f2' may correspond to the f2.

The uplink signal transmission by the terminal to the macro base station and the small base stations may be performed at different timing points or simultaneously performed. In any case, due to the physical constraints of a power amplifier element of the terminal and the propagation restrictions for the terminal transmission power, the total sum of the uplink transmission powers of the terminal at any moment should be kept within a predetermined threshold.

In the environment as illustrated in FIG. 3, the operation of the terminal 309, which is connected to the macro base station 301 and the small base stations 303, 305, and 307 to perform communication, is referred to as dual connectivity (DC). When the terminal performs dual connectivity, two configuration schemes are possible.

First, after the terminal performs initial access to the macro base station 301 operating as an LTE/LTE-A system, the terminal receives configuration information for data transmission or reception for the macro base station from a higher layer signal (a system or radio resource control (RRC) signal). Thereafter, the terminal receives configuration information for data transmission or reception for the small base stations 303, 304, and 305 operating as an NR system from a higher layer signal (a system or RRC signal) of the macro base station 301, and performs random access to the small base stations 303, 304, and 305, and thus the terminal is to be in a dual connectivity state in which data transmission or reception to or from the macro base station 301 and the small base stations 303, 304, and 305 is possible.

Here, the macro base station 301 operating as the LTE/LTE-A system is referred to as a master cell group (MCG), and the small base stations 303, 304, and 305 operating as the NR system are referred to as a secondary cell group (SCG). The feature wherein the terminal is in the dual connectivity state may be expressed such that the terminal is configured as the MCG using the evolved-universal mobile communications system (UMTS) terrestrial radio access (E-UTRA) and as the SCG using NR radio access. Otherwise, it may be expressed such that the terminal is configured to be in E-UTRA NR dual connectivity (EN-DC).

Second, after the terminal performs initial access to the small base stations 303, 304, and 305 operating as the NR system, the terminal receives configuration information for data transmission or reception for the small base station from a higher layer signal (a system or RRC signal). Thereafter, the terminal receives the configuration information for data transmission or reception for the macro base station 301 operating in the LTE/LTE-A system from a higher layer signal (a system or RRC signal) of the small base station 303, 304, and 305 performs random access to the macro base station 301, and thus the terminal is to be in a dual connectivity state in which data transmission or reception to or from the small base stations 303, 304, and 305 and the macro base station 301 is possible.

Here, the small base stations 303, 304, and 305 operating as the NR system are referred to as the MCG, and the macro base station 301 operating as the LTE system is referred to as the SCG. The feature wherein the terminal is in the dual connectivity state may be expressed such that the terminal is configured as the MCG using NR radio access and as the SCG using E-UTRA radio access (or LTE/LTE-A). Otherwise, it may be expressed such that the terminal is configured to be in NR E-UTRA dual connectivity (NE-DC).

Hereinafter, the embodiments described in the disclosure will be proposed by considering the first dual connectivity configuration scheme and the second dual connectivity configuration scheme. That is, the disclosure proposes another embodiment according to whether LTE cells using E-UTRA are the MCG or NR cells using NR are the MCG. The reason is that when the terminal is in a dual connectivity state, importance should be given to uplink transmission to the MCG rather than uplink transmission to the SCG. In addition, timing at which uplink transmission to a cell using NR is performed, for example, PDCCH-to-PUSCH transmission timing or PDCCH-to-PUCCH transmission timing may be indicated differently by a higher layer signal configuration and an indication from the PDCCH. However, since timing at which uplink transmission to a cell using LTE is performed, for example, PDCCH-to-PUSCH transmission timing or PDCCH-to-PUCCH transmission timing is fixed, embodiments of the disclosure are proposed in consideration of these conditions.

Figure 4:
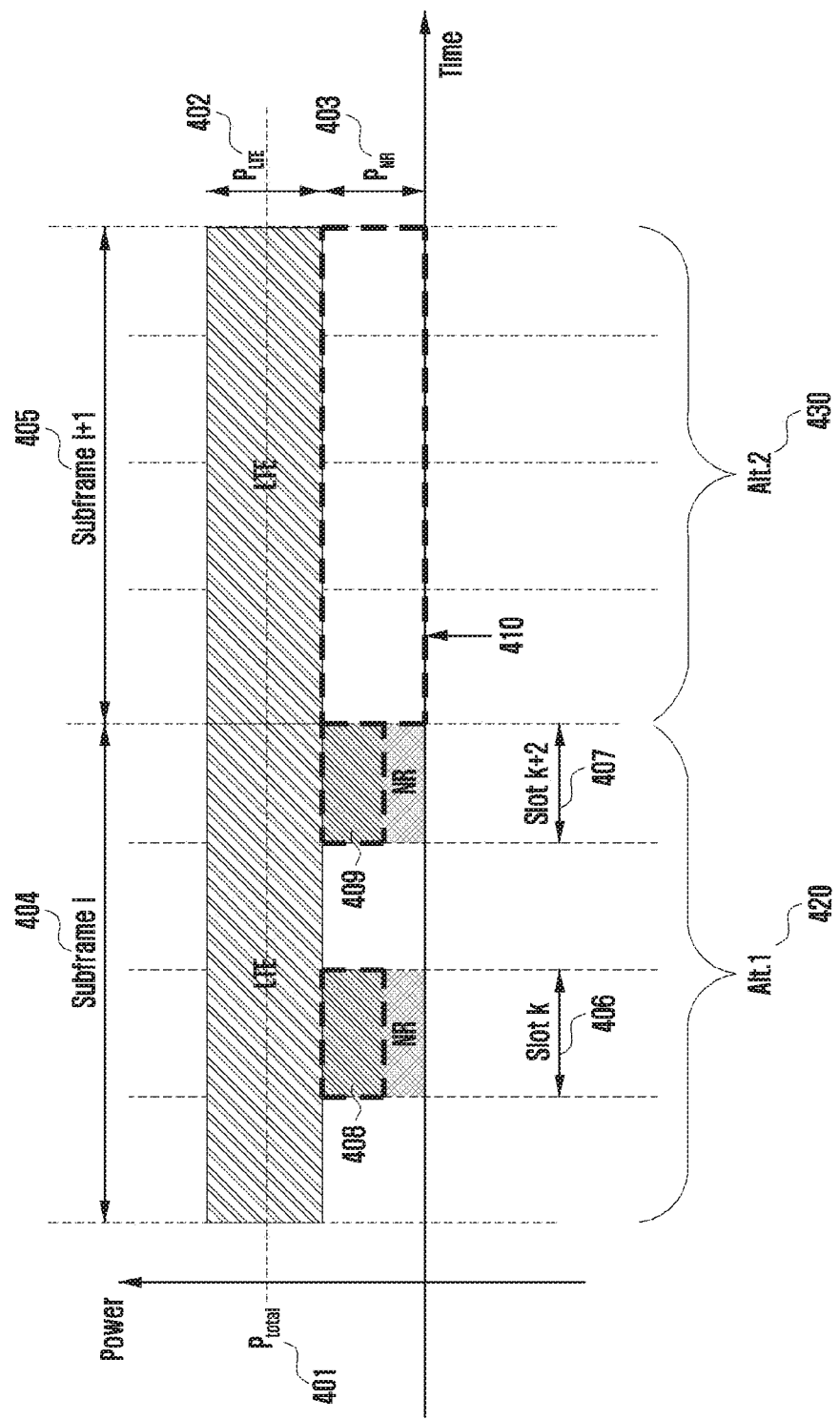
FIG. 4 illustrates a scheme for controlling power of uplink transmission according to embodiments 1 and 2 of the disclosure.

FIG. 4 illustrates a scheme for controlling power of uplink transmission according to embodiments 1 and 2 of the disclosure. Embodiments 1 and 2 may be applied to the case where the terminal is configured to be in E-UTRA NR dual connectivity (EN-DC).

In embodiments 1 and 2, by a higher layer signal, the terminal receives configuration of P_LTE 402, which is the maximum transmission power for uplink transmission in an MCG, P_NR 403, which is the maximum transmission power for uplink transmission in an SCG, and P_total 401, which is the maximum transmission power in EN-DC. Here, with respect to the case where the value obtained by summing the P_LTE 402 and the P_NR 403 is greater than P_total, embodiment 1 relating to a case in which the terminal has a capability for dynamic transmission power distribution will be provided.

Embodiment 1

In embodiment 1 (indicated by reference numeral 420), when a terminal has the capability to perform dynamic transmission power distribution and a subframe i 404 for LTE uplink transmission overlaps a slot k 406 or a slot k+2 407 for NR uplink transmission, the value obtained by summing P_LTE 402 and P_NR 403 exceeds P_total 401. In this case, the terminal may give importance to the MCG using E-UTRA radio access (or LTE/LTE-A), and thus may lower transmission power of the SCG using NR. Accordingly, the terminal may reduce the transmission power for NR transmission so that the value obtained by summing the P_LTE 402 and the P_NR 403 is included in the P_total 401 (indicated by reference numerals 408 and 409).

In embodiment 1, when the terminal has the capability to perform dynamic transmission power distribution, the terminal transmits a capability signal for the dynamic transmission power distribution to an LTE base station or an NR base station in advance.

Next, in a case where the value obtained by summing the P_LTE 402 and the P_NR 403 is greater than the P_total 401, embodiment 2 relating to a case in which the terminal does not have the capability to perform dynamic transmission power distribution will be provided.

Embodiment 2

In embodiment 2 (indicated by reference numeral 430), if the terminal does not have the capability to perform dynamic transmission power distribution and thus fails to transmit the capability signal to the base station, the terminal receives configuration information indicating subframes in which LTE uplink transmission is performed, from the LTE or NR base station via a system or higher layer signal. The configuration information may be time-division duplex (TDD) configuration information indicating an uplink and downlink subframe section, and the configuration information may be received by the terminal and applied to the LTE cell regardless of whether the LTE cell is TDD or FDD. Upon reception of the configuration information, the terminal determines that LTE uplink transmission is performed only in a subframe indicated by an uplink subframe, and does not perform NR uplink transmission in slots which overlap the uplink subframe 405 and enable NR transmission (indicated by reference numeral 410). That is, even if the NR base station configures or schedules NR uplink transmission in slots overlapping the uplink subframe 405, the terminal may not perform the NR transmission.

Figure 5:
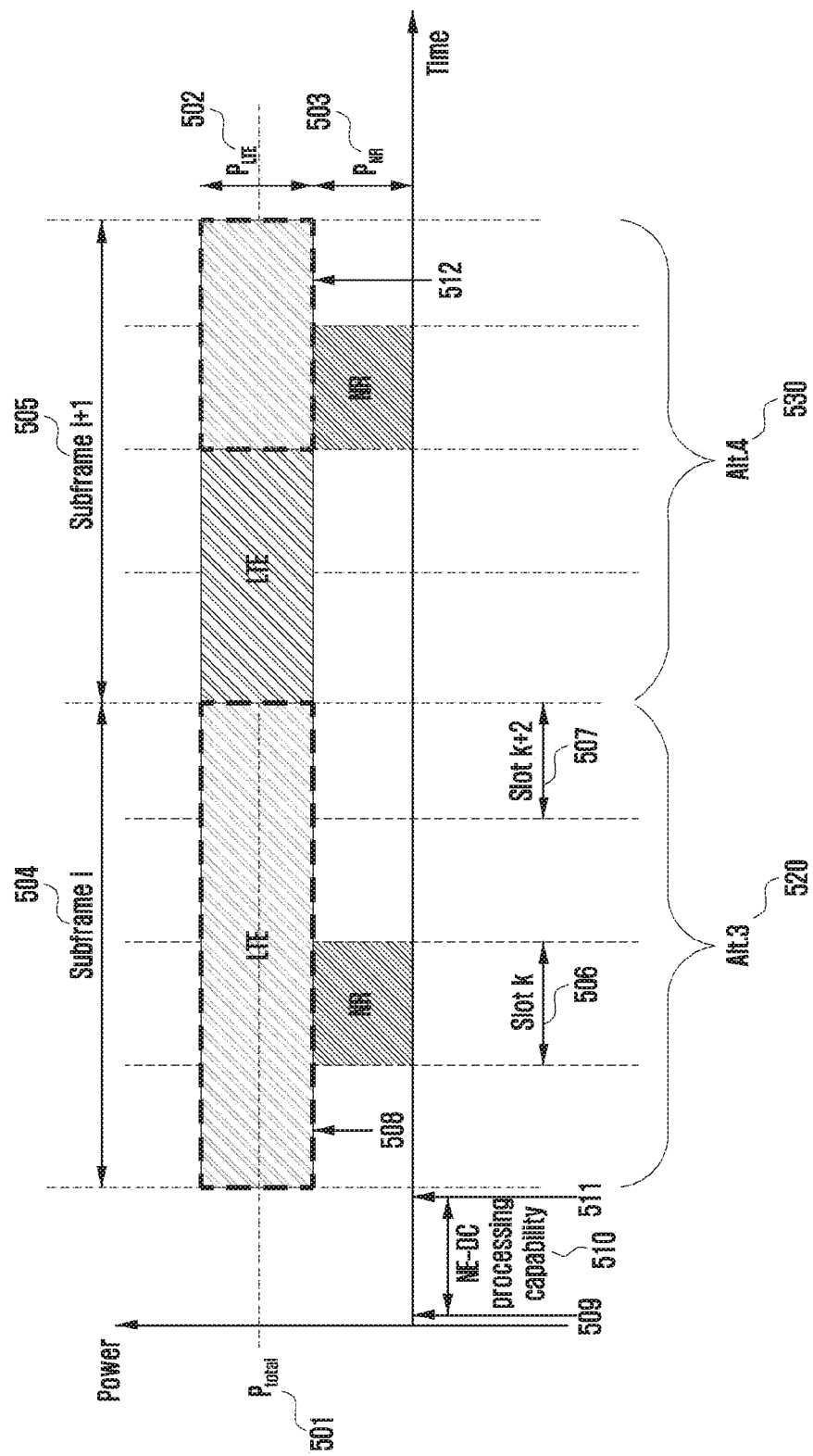
FIG. 5 illustrates a scheme for controlling power of uplink transmission according to embodiments 3 and 4 of the disclosure.

FIG. 5 illustrates a scheme for controlling power of uplink transmission according to embodiments 3 and 4 of the disclosure. Embodiments 3 and 4 may be applied to the case where the terminal is configured to be in an NR E-UTRA dual connectivity (NE-DC).

In embodiments 3 and 4, the terminal receives configuration of P_LTE 502, which is the maximum transmission power for uplink transmission in the SCG, P_NR 503, which is the maximum transmission power for uplink transmission in the MCG, and P_total 501, which is the maximum transmission power in EN-DC. Here, with respect to the case where the value obtained by summing the P_LTE 502 and the P_NR 503 is greater than P_total 501, embodiment 3 relating to a case in which the terminal does not have the capability to perform dynamic transmission power distribution will be provided.

Embodiment 3

In embodiment 3 (indicated by reference numeral 520), if the terminal does not have the capability to perform dynamic transmission power distribution and thus fails to transmit the capability signal to the base station, the terminal receives configuration information indicating subframes in which LTE uplink transmission is performed, from the LTE or NR base station via a system or higher layer signal. The configuration information may be TDD configuration information indicating an uplink and downlink subframe section, and the configuration information may be received by the terminal and applied to the LTE cell regardless of whether the LTE cell is TDD or FDD.

Here, when the terminal is configured to be in the EN-DC, the terminal may perform an operation different from embodiment 2 in which the LTE uplink transmission is always performed in the LTE uplink subframe. This is because, when the terminal is configured to be in the NE-DC, the terminal needs to first perform NR uplink transmission, which is MCG. Accordingly, even when the terminal determines that the LTE uplink transmission is performed in a subframe indicated as the uplink subframe through reception of the configuration information, the terminal may provide a method for performing the NR uplink transmission instead of the LTE uplink transmission in slots which overlap the uplink subframe 504 and enable NR transmission.

In embodiment 3 (indicated by reference numeral 520), the terminal may receive a PDCCH indicating NR uplink transmission. Here, when a value 511, obtained by adding the NE-DC processing capability 510 configured for the terminal to the last symbol 509 of the PDCCH indicating NR uplink transmission, corresponds to a position before a start symbol (that is, a start symbol of subframe i (504)) in which LTE uplink transmission needs to be transmitted, the terminal drops the LTE uplink transmission (indicated by reference numeral 508).

If the terminal receives the PDCCH for scheduling the PDSCH, the NE-DC processing capability 510 configured for the terminal may be the number of symbols (N1) corresponding to a time required for PDSCH reception for the PDSCH processing capability, or may also be (N1+X) symbols obtained by adding a constant X to N1 symbols. If the terminal receives the PDCCH for scheduling the PUSCH, the NE-DC processing capability 510 configured for the terminal may be the number of symbols (N2) corresponding to a time required for PUSCH preparation for the PUSCH processing capability, or may also be (N2+Y) symbols obtained by adding a constant Y to N2 symbols. Otherwise, for the processing capability required for HARQ-ACK transmission corresponding to downlink semi-persistent scheduling (SPS) release, the NE-DC processing capability 510 may be defined as a value defined as N symbols added up from the last symbol, after the PDCCH is received.

The number of N symbols may be determined as a different value according to subcarrier spacing of the LTE cell or the NR cell. For example, 13 symbols may be determined when the subcarrier spacing is 15 KHz, 15 symbols may be determined when the subcarrier spacing is for 30 KHz, 22 symbols may be determined when the subcarrier spacing is 60 KHz, and 25 symbols may be determined when the subcarrier spacing is 120 KHz. Otherwise, the terminal may conservatively determine to set the NE-DC processing capability 510 as a maximum value of N1 or N1+X, N2 or N2+Y, and N, and may determine whether to drop the LTE uplink transmission by using the set value. Before the base station configures the NE-DC processing capability 510 via a higher layer signal, the terminal transmits the PDSCH processing capability related information or the PUSCH processing capability related information to the base station, the base station configures N1 or N1+X, N2 or N2+Y, and N values, suitable for the terminal, via the higher layer signal by considering the processing capability related information received from the terminal, and the terminal may receive the configuration.

Next, with respect to the case where the value obtained by summing the P_LTE 502 and the P_NR 503 is greater than the P_total 501, embodiment 4 relating to a case in which the terminal does not have the capability to perform dynamic transmission power distribution will be provided.

Embodiment 4

In embodiment 4 (indicated by reference numeral 530), if the terminal does not have the capability to perform dynamic transmission power distribution and thus fails to transmit the capability signal to the base station, the terminal receives configuration information indicating subframes in which LTE uplink transmission is performed, from the LTE or NR base station via a system or higher layer signal. The configuration information may be TDD configuration information indicating an uplink and downlink subframe section, and the configuration information may be received by the terminal and applied to the LTE cell regardless of whether the LTE cell is TDD or FDD.

Here, when the terminal is configured to be in the EN-DC, the terminal may perform an operation different from embodiment 2 in which the LTE uplink transmission is always performed in the LTE uplink subframe. This is because, when the terminal is configured to be in the NE-DC, the terminal needs to first perform NR uplink transmission, which is MCG. Accordingly, even when the terminal determines that the LTE uplink transmission is performed in a subframe indicated as the uplink subframe through reception of the configuration information, the terminal may provide a scheme for performing the NR uplink transmission instead of the LTE uplink transmission in slots which overlap the uplink subframe 505 and enable NR transmission.

The terminal may receive a PDCCH indicating NR uplink transmission while performing LTE uplink transmission in the subframe 505. At this time, the terminal drops LTE transmission being performed (indicated by reference numeral 512), and performs NR uplink transmission based on a PDCCH indicating NR uplink transmission. Otherwise, when the value obtained by summing the last symbol of PDCCH reception and the NE-DC processing capability 510 in embodiment 3 corresponds to a position after the LTE transmission start symbol, the terminal performs LTE uplink transmission, drops LTE transmission from a symbol in which NR uplink transmission needs to be performed based on the PDCCH indicating NR uplink transmission, and then performs the NR transmission.

Although not shown in the present embodiment, as another embodiment, the terminal determines that the LTE uplink transmission is performed only in a subframe indicated by an uplink subframe through reception of configuration information by which the LTE uplink transmission is performed. Further, the terminal may determine that NR uplink transmission is performed among the remaining subframes not indicated as the LTE uplink subframe.

Figure 6:
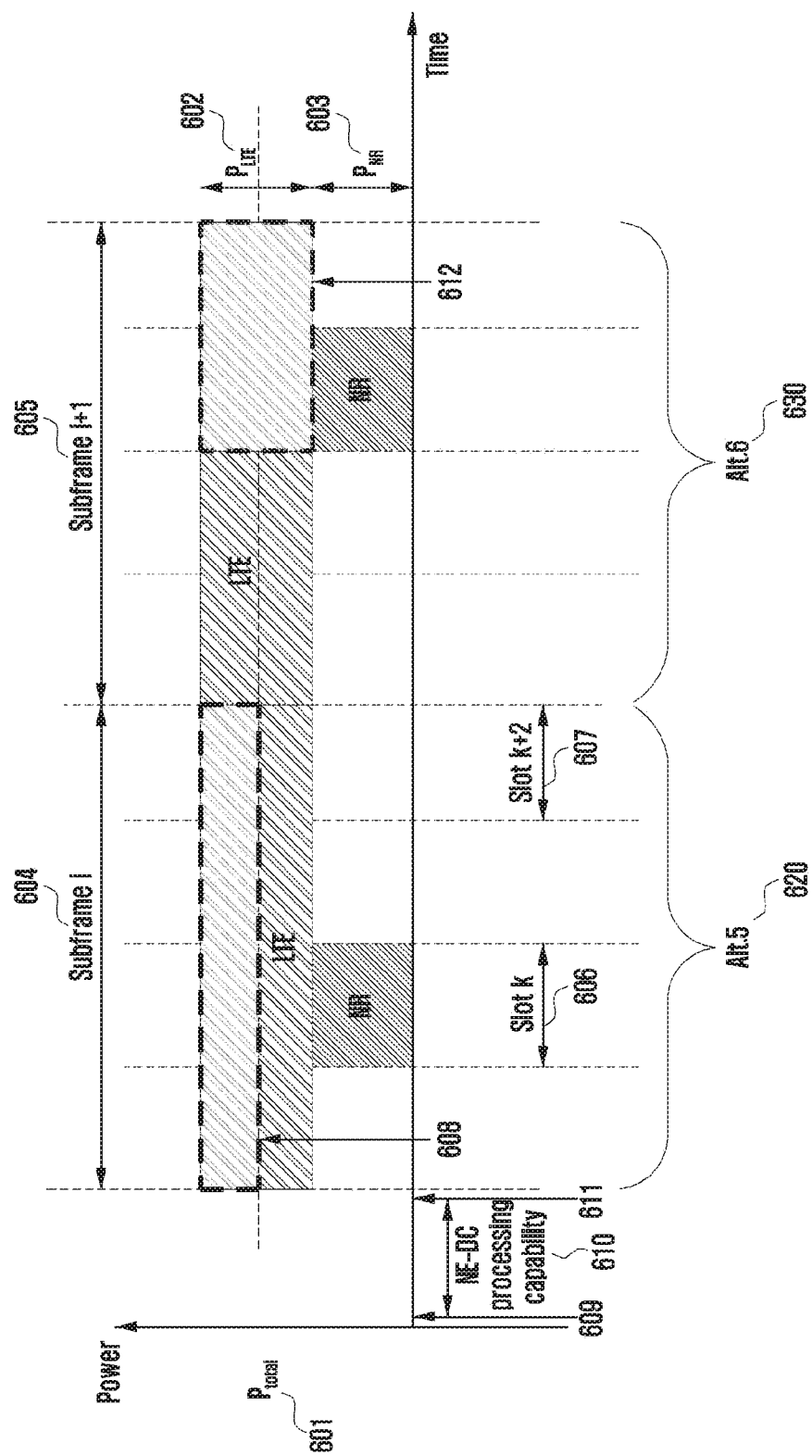
FIG. 6 illustrates a scheme for controlling power of uplink transmission according to embodiments 5 and 6 of the disclosure.

FIG. 6 illustrates a scheme for controlling power of uplink transmission according to embodiments 5 and 6 of the disclosure. Embodiments 5 and 6 may be applied to the case where the terminal is configured to be in the NR E-UTRA dual connectivity (NE-DC).

In embodiments 5 and 6, the terminal receives configuration for P_LTE 602, which is the maximum transmission power for uplink transmission in the SCG, P_NR 603, which is the maximum transmission power for uplink transmission in the MCG, and P_total 601, which is the maximum transmission power in the NE-DC. Here, with respect to the case in which a value obtained by summing the P_LTE 602 and the P_NR 603 is greater than the P_total 601, embodiment 5 relating to a case in which the terminal has the capability to perform dynamic transmission power distribution will be provided.

Embodiment 5

In embodiment 5 (indicated by reference numeral 620), when the terminal has the capability to perform dynamic transmission power distribution, the terminal transmits a capability signal for the dynamic transmission power distribution to the LTE base station or the NR base station in advance.

In embodiment 5 (indicated by reference numeral 620), when the terminal has the capability to perform dynamic transmission power distribution, and a subframe i 604 for LTE uplink transmission overlaps a slot k 606 for NR uplink transmission, the value obtained by summing P_LTE 602 and P_NR 603 exceeds P_total 601. In this case, the terminal may lower the transmission power of the SCG using E-UTRA (or LTE/LTE-A) by giving importance to the MCG using NR. Here, when the transmission power of the SCG using E-UTRA needs to be lowered, a problem that is not predictable may occur due to the flexible timing support of the NR uplink transmission. In other words, since the NR uplink transmission timing is not predictable, embodiment 5 provides a scheme for lowering the power of LTE uplink transmission by considering the processing capability of NR uplink transmission.

In embodiment 5 (indicated by reference numeral 620), the terminal may receive a PDCCH indicating NR uplink transmission. In this case, when a value 611 obtained by adding the NE-DC processing capability 610 configured for the terminal to the last symbol 609 of the PDCCH indicating NR uplink transmission corresponds to a position before a start symbol (i.e., the start symbol of the subframe i 604), the terminal reduces the transmission power of the LTE uplink transmission (indicated by reference numeral 508). In this case, the terminal may reduce the transmission power for LTE uplink transmission such that the value obtained by summing the P_LTE 602 and the P_NR 603 is included in the P_total 601 (indicated by reference numeral 508).

If the terminal receives the PDCCH for scheduling the PDSCH, the NE-DC processing capability 610 configured for the terminal may be the number of symbols (N1) corresponding to a time required for PDSCH reception for the PDSCH processing capability, or may also be (N1+X) symbols obtained by adding a constant X to N1 symbols. If the terminal receives the PDCCH for scheduling the PUSCH, the NE-DC processing capability 610 configured for the terminal may be the number of symbols (N2) corresponding to a time required for PUSCH preparation for the PUSCH processing capability, or may also be (N2+Y) symbols obtained by adding a constant Y to N2 symbols. Otherwise, for the processing capability required for HARQ-ACK transmission corresponding to downlink semi-persistent scheduling (SPS) release, the NE-DC processing capability 610 may be defined as a value defined as N symbols added up from the last symbol, after the PDCCH is received.

The number of N symbols may be determined as a different value according to subcarrier spacing of the LTE cell or the NR cell. For example, 13 symbols may be determined when the subcarrier spacing is 15 KHz, 15 symbols may be determined when the subcarrier spacing is for 30 KHz, 22 symbols may be determined when the subcarrier spacing is 60 KHz, and 25 symbols may be determined when the subcarrier spacing is 120 KHz. Otherwise, the terminal may conservatively determine to set the NE-DC processing capability 610 as a maximum value of N1 or N1+X, N2 or N2+Y, and N, and the terminal may reduce the power of the LTE uplink transmission by using the set value. Before the base station configures the NE-DC processing capability 610 based on a higher layer signal, the terminal transmits the PDSCH processing capability related information or the PUSCH processing capability related information to the base station, the base station configures N1 or N1+X, N2 or N2+Y, and N values, suitable for the terminal, via the higher layer signal by considering the processing capability related information received from the terminal, and the terminal may receive the configuration.

Next, with respect to the case where the value obtained by summing the P_LTE 602 and the P_NR 603 is greater than the P_total 601, embodiment 6 relating to a case in which the terminal has the capability to perform dynamic transmission power distribution will be provided.

Embodiment 6

In embodiment 6 (indicated by reference numeral 630), when the terminal has the capability to perform dynamic transmission power distribution, the terminal transmits a capability signal for the dynamic transmission power distribution to the LTE base station or the NR base station in advance.

The terminal may receive a PDCCH indicating NR uplink transmission while performing LTE uplink transmission in the subframe 605. Here, the terminal drops the LTE transmission being performed (indicated by reference numeral 612), and performs NR uplink transmission based on a PDCCH indicating NR uplink transmission. Otherwise, when the value obtained by summing the last symbol of PDCCH reception and the NE-DC processing capability 610 in embodiment 5 corresponds to a position after the LTE transmission start symbol, the terminal performs LTE uplink transmission, drops the LTE transmission from a symbol in which NR uplink transmission needs to be performed based on the PDCCH indicating NR uplink transmission, and then performs the NR transmission.

The reason for dropping the LTE uplink transmission instead of reducing the power of the LTE uplink transmission in the terminal operation as described above is that, in the case of LTE uplink transmission, the transmission power cannot be changed in the middle of the subframe. Therefore, when NR uplink transmission occurs while performing the LTE uplink transmission as described above, the terminal drops the LTE uplink transmission and performs NR uplink transmission indicated via the PDCCH or configured by a higher layer signal.

Embodiment 7

Next, with respect to the case where the value obtained by summing P_LTE 702 and P_NR 703 is greater than P_total 701, embodiment 7 relating to a case in which the terminal has the capability to perform dynamic transmission power distribution will be provided.

In the embodiment 7, the NE-DC terminal determines different Pcmaxs for LTE subframes. That is, the terminal receives the configuration of the DL, UL, flexible, reserved slots from the NR base station via a higher layer signal (system information or RRC signal) to determine that uplink transmission for the NR may occur in the UL slot or flexible slot. In addition, the terminal determines Pcmax for an LTE subframe 704 overlapping, even in one OFDM symbol, the UL slot or flexible slots 720 where NR uplink may occur, and Pcmax for the LTE subframe 705 overlapping the DL slot or reserved slot 730 where NR uplink transmission may not occur, respectively.

For the LTE subframe 704, Pcmax, which is the maximum value of LTE transmission power, is determined to be a value smaller than or equal to p_LTE*r (indicated by reference numeral 710), and for the LTE subframe 705, Pcmax, which is the maximum value of LTE transmission power, is determined to be a value smaller than or equal to p_LTE (indicated by reference numeral 711). The p_LTE and p_NR may be received, by the terminal, from a higher layer signal transmitted from the LTE base station or the NR base station, and r may be configured, for each LTE subframe, as a value smaller than or equal to 1, and may be received by the terminal from a higher layer signal transmitted from the LTE base station or the NR base station.

When NR uplink transmission occurs in the LTE subframe 704, the terminal may configure Pcmax of NR to be a value smaller than or equal to min (p_NR, P_total-p_lte_actual) in order to allocate transmission power (P_NR) of NR. In the LTE subframe 704, the terminal allocates P_LTE having a value smaller than or equal to the LTE Pcmax 710 for LTE uplink transmission. In embodiment 7, the terminal allocates p_lte_actual 712 to perform LTE uplink transmission.

In the subframe 705, it may be assumed that there is no NR uplink transmission, and thus the terminal allocates P_LTE having a value smaller than or equal to the LTE Pcmax 711 for the LTE uplink transmission to perform LTE uplink transmission.

In another embodiment, even if embodiment 7 described above is applied, in a case where NE-DC processing capability is configured by the RRC and the NR UL slot or the flexible slot are slots for which NR UL transmission cannot be performed due to the NE-DC processing capability and a downlink control channel indicating NR uplink transmission, the terminal may not need to limit the LTE transmission power in the LTE uplink subframe overlapping the NR slots. Accordingly, in the above case, the NE-DC terminal may determine Pcmax as a value smaller than or equal to p_LTE and determine P_LTE in the LTE uplink subframe. Otherwise, the NE-DC terminal may determine r, configured from the NR base station or the LTE base station, to be 1, and determine P_LTE.

If the terminal receives the PDCCH for scheduling the PDSCH, the NE-DC processing capability configured for the terminal may be the number of symbols (N1) corresponding to a time required for PDSCH reception for the PDSCH processing capability, or may also be (N1+X) symbols obtained by adding a constant X to N1 symbols. If the terminal receives the PDCCH for scheduling the PUSCH, the NE-DC processing capability configured for the terminal may be the number of symbols (N2) corresponding to a time required for PUSCH preparation for the PUSCH processing capability, or may also be (N2+Y) symbols obtained by adding a constant Y to N2 symbols. Otherwise, for the processing capability required for HARQ-ACK transmission corresponding to downlink semi-persistent scheduling (SPS) release, the NE-DC processing capability may be defined as a value defined as N symbols added up from the last symbol, after the PDCCH is received. Otherwise, the NE-DC processing capability may be a constant value determined according to the subcarrier spacing of the NR cell.

The number of N symbols may be determined as a different value according to the subcarrier spacing of the LTE cell or the NR cell. For example, 13 symbols may be determined when the subcarrier spacing is 15 KHz, 15 symbols may be determined when the subcarrier spacing is for 30 KHz, 22 symbols may be determined when the subcarrier spacing is 60 KHz, and 25 symbols may be determined when the subcarrier spacing is 120 KHz. Otherwise, the terminal may conservatively determine to set the NE-DC processing capability as the maximum value or the minimum value of N1 or N1+X, N2 or N2+Y, and N, and may reduce the power of the LTE uplink transmission by using the set value. Before the base station configures, for the terminal, the NE-DC processing capability via a higher layer signal, the terminal transmits the PDSCH processing capability-related or the PUSCH processing capability-related information to the base station, the base station configures N1 or N1+X, N2 or N2+Y, and N values, suitable for the terminal, via the higher layer signal by considering the processing capability related information received from the terminal, and the terminal may receive the configuration.

Embodiment 8

Next, with respect to the case where the value obtained by summing P_LTE 802 and P_NR 803 is greater than P_total 801, embodiment 8 relating to a case in which the terminal has the capability to perform dynamic transmission power distribution will be provided.

In embodiment 8, the NE-DC terminal determines different Pcmaxs for LTE subframes. That is, the terminal receives the configuration of the DL, UL, flexible, and reserved slots from the NR base station via a higher layer signal (system information or RRC signal), and determines that uplink transmission for the NR may occur in the UL slot or flexible slot. In addition, the terminal determines Pcmax for an LTE subframe 804 overlapping, even in one OFDM symbol, the UL slot or flexible slot 820 where NR uplink transmission may occur, and Pcmax for an LTE subframe 805 overlapping the DL slot or reserved slot 830 where NR uplink may not occur, respectively.

For the LTE subframe 804, Pcmax, which is the maximum value of LTE transmission power, is determined to be a value smaller than or equal to p_LTE (indicated by reference numeral 810), and for the LTE subframe 805, Pcmax, which is the maximum value of LTE transmission power, is determined to be maintained (indicated by reference numeral 811). The p_LTE and p_NR may be received by the terminal from a higher layer signal transmitted from the LTE base station or the NR base station.

When NR uplink transmission occurs in the LTE subframe 804, the terminal may configure Pcmax of NR as a value smaller than or equal to min (p_NR, P_total-p_lte_actual) in order to allocate transmission power (P_NR) of NR. In the LTE subframe 804, the terminal allocates P_LTE having a value smaller than or equal to the LTE Pcmax 810 for LTE uplink transmission. In embodiment 8, the terminal allocates p_lte_actual 812 to perform LTE uplink transmission. In the subframe 805, it may be assumed that there is no NR uplink transmission, and thus the terminal allocates P_LTE having a value smaller than or equal to the LTE Pcmax 811 for the LTE uplink transmission to perform LTE uplink transmission.

In another embodiment, even if embodiment 8 described above is applied, in a case where NE-DC processing capability is configured by the RRC and the NR UL slot or the flexible slot are slots for which NR UL transmission may not be performed due to the NE-DC processing capability and a downlink control channel indicating NR uplink transmission, the terminal may not need to limit the LTE transmission power in the LTE uplink subframe overlapping the NR slots. Accordingly, in the above case, the NE-DC terminal may determine to maintain Pcmax and determine P_LTE in the LTE uplink subframe.

If the terminal receives the PDCCH for scheduling the PDSCH, the NE-DC processing capability configured for the terminal may be the number of symbols (N1) corresponding to a time required for PDSCH reception for the PDSCH processing capability, or may also be (N1+X) symbols obtained by adding a constant X to N1 symbols. If the terminal receives the PDCCH for scheduling the PUSCH, the NE-DC processing capability configured for the terminal may be the number of symbols (N2) corresponding to a time required for PUSCH preparation for the PUSCH processing capability, or may also be (N2+Y) symbols obtained by adding a constant Y to N2 symbols. Otherwise, for the processing capability required for HARQ-ACK transmission corresponding to downlink semi-persistent scheduling (SPS) release, the NE-DC processing capability may be defined as a value defined as N symbols added up from the last symbol, after the PDCCH is received. Otherwise, the NE-DC processing capability may be a constant value determined according to the subcarrier spacing of the NR cell.

The number of N symbols may be determined as a different value according to the subcarrier spacing of the LTE cell or the NR cell. For example, 13 symbols may be determined when the subcarrier spacing is 15 KHz, 15 symbols may be determined when the subcarrier spacing is for 30 KHz, 22 symbols may be determined when the subcarrier spacing is 60 KHz, and 25 symbols may be determined when the subcarrier spacing is 120 KHz. Otherwise, the terminal may conservatively determine to set the NE-DC processing capability as the maximum value or the minimum value of N1 or N1+X, N2 or N2+Y, and N, and may reduce the power of the LTE uplink transmission by using the set value. Before the base station configures, for the terminal, the NE-DC processing capability via a higher layer signal, the terminal transmits the PDSCH processing capability-related or the PUSCH processing capability-related information to the base station, the base station configures N1 or N1+X, N2 or N2+Y, and N values, suitable for the terminal, via the higher layer signal by considering the processing capability related information received from the terminal, and the terminal may receive the configuration.

Embodiment 9

Next, with respect to the case where the value obtained by summing P_LTE 902 and P_NR 903 is greater than P_total 901, embodiment 9 relating to a case in which the terminal has the capability to perform dynamic transmission power distribution will be provided.

In embodiment 9, a NE-DC terminal maintains Pcmax for LTE subframes. That is, the terminal determines to apply Pcmax, which is the maximum value of the LTE transmission power, to all the LTE subframes 904 and 905 (indicated by reference numeral 910). The p_LTE and p_NR may be received by the terminal from a higher layer signal transmitted from the LTE base station or the NR base station. When NR uplink transmission occurs in the LTE subframe 904, the terminal may configure Pcmax of the NR to be a value smaller than or equal to min (p_NR, P_total-p_lte_actual) in order to allocate the transmission power (P_NR) of the NR.

In the LTE subframes 904 and 905, the terminal allocates P_LTE having a value smaller than or equal to the LTE Pcmax 910 for LTE uplink transmission. In embodiment 9, the terminal performs LTE uplink transmission by allocating p_lte_actual 912. Therefore, in embodiment 9, the LTE Pcmax 910 needs to be conservatively determined regardless of whether NR uplink transmission occurs, and there is a disadvantage in that even when there is no NR transmission, the LTE transmission power needs to be limited lower only.

In another embodiment, even if embodiment 9 described above is applied, in a case where NE-DC processing capability is configured by the RRC and the slots are slots in which NR UL transmission cannot be performed due to the NE-DC processing capability and a downlink control channel indicating NR uplink transmission, the terminal may not need to limit the LTE transmission power in the LTE uplink subframe overlapping the NR slots. Accordingly, in the above case, the NE-DC terminal may determine to maintain Pcmax and determine P_LTE in the LTE uplink subframe.

If the terminal receives the PDCCH for scheduling the PDSCH, the NE-DC processing capability configured for the terminal may be the number of symbols (N1) corresponding to a time required for PDSCH reception for the PDSCH processing capability, or may also be (N1+X) symbols obtained by adding a constant X to N1 symbols. If the terminal receives the PDCCH for scheduling the PUSCH, the NE-DC processing capability configured for the terminal may be the number of symbols (N2) corresponding to a time required for PUSCH preparation for the PUSCH processing capability, or may also be (N2+Y) symbols obtained by adding a constant Y to N2 symbols. Otherwise, for the processing capability required for HARQ-ACK transmission corresponding to downlink semi-persistent scheduling (SPS) release, the NE-DC processing capability may be defined as a value defined as N symbols added up from the last symbol, after the PDCCH is received. Otherwise, the NE-DC processing capability may be a constant value determined according to the subcarrier spacing of the NR cell.

The number of N symbols may be determined as a different value according to the subcarrier spacing of the LTE cell or the NR cell. For example, 13 symbols may be determined when the subcarrier spacing is 15 KHz, 15 symbols may be determined when the subcarrier spacing is for 30 KHz, 22 symbols may be determined when the subcarrier spacing is 60 KHz, and 25 symbols may be determined when the subcarrier spacing is 120 KHz. Otherwise, the terminal may conservatively determine to set the NE-DC processing capability as the maximum value or the minimum value of N1 or N1+X, N2 or N2+Y, and N, and may reduce the power of the LTE uplink transmission by using the set value. Before the base station configures, for the terminal, the NE-DC processing capability via a higher layer signal, the terminal transmits the PDSCH processing capability-related or the PUSCH processing capability-related information to the base station, the base station configures N1 or N1+X, N2 or N2+Y, and N values, suitable for the terminal, via the higher layer signal by considering the processing capability related information received from the terminal, and the terminal may receive the configuration.

In all the above embodiments, for the case where the value obtained by summing P_LTE and P_NR is smaller than P_total, the terminal may perform LTE uplink transmission by applying the P_LTE and perform NR uplink transmission by applying the P_NR.

Figure 10:
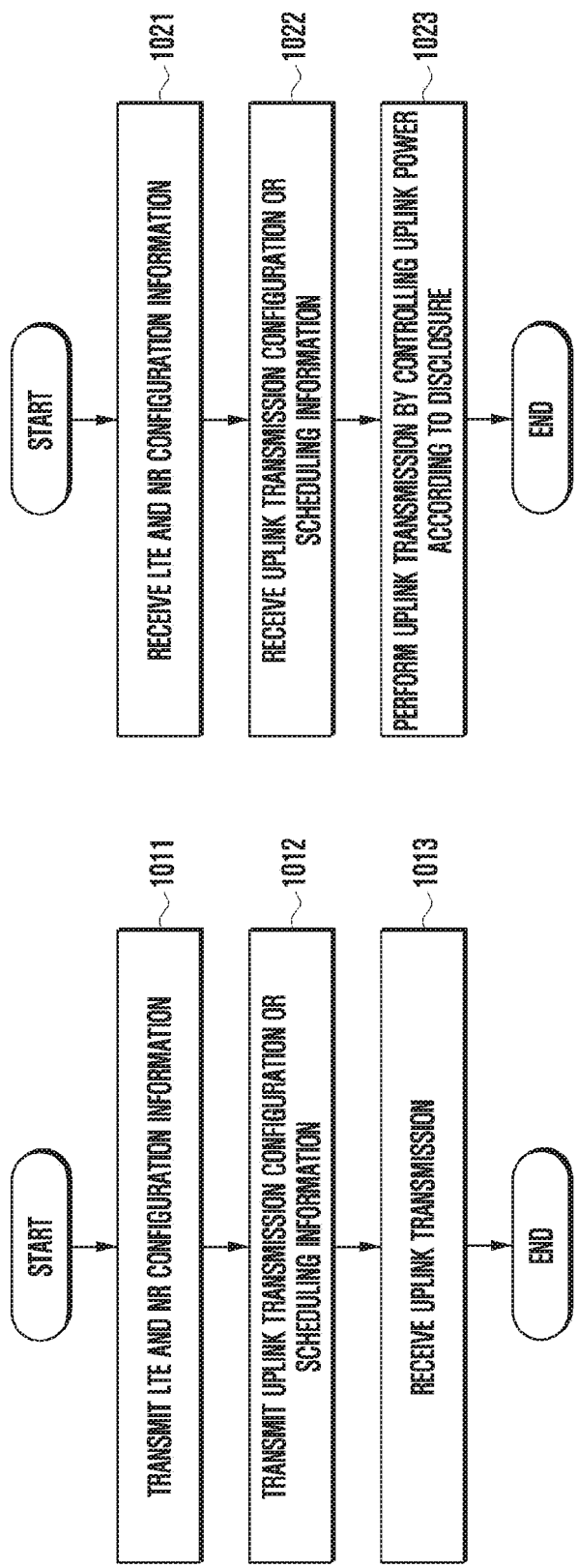
FIG. 10 illustrates a base station procedure and a terminal procedure according to embodiments of the disclosure.

Next, FIG. 10 illustrates a base station procedure and a terminal procedure according to the embodiments proposed by the disclosure.

First, the base station procedure will be described.

In operation 1011, a base station transmits configuration information of each cell to a terminal through system information or a higher layer signal. The configuration information may be cell-related information (TDD or FDD information, an uplink/downlink carrier frequency, an uplink/downlink frequency band, an uplink/downlink subcarrier spacing, etc.) of MCG or SCG cells required for dual connectivity, and may be configuration information required for data transmission or reception in the MCG or SCG. Otherwise, the configuration information may be configuration information related to the NE-DC processing capability described in the embodiments of the disclosure. The base station may be an NR base station using NR radio access or an E-UTRA base station using E-UTRA radio access.

In operation 1012, the base station configures uplink transmission for the terminal and transmits scheduling information indicating the uplink transmission according to the embodiments proposed by the disclosure. The base station may be an NR base station using NR radio access or an E-UTRA base station using E-UTRA radio access. The uplink transmission configuration may denote uplink transmission in which transmission is configured by higher layer signal configuration instead of being indicated by a PDCCH, like periodic channel information transmission, and uplink transmission indicated by the scheduling information may denote uplink transmission indicated by the PDCCH and transmitted from the terminal, like PUSCH transmission or HARQ-ACK transmission.

In operation 1013, the base station receives uplink transmission from the terminal according to the embodiments proposed by the disclosure. The base station may be an NR base station using NR radio access or an E-UTRA base station using E-UTRA radio access.

Next, the terminal procedure will be described.

In operation 1021, the terminal receives configuration information of each cell from the base station through system information or a higher layer signal. The configuration information may be cell-related information (TDD or FDD information, an uplink/downlink carrier frequency, an uplink/downlink frequency band, an uplink/downlink subcarrier spacing, etc.) of MCG or SCG cells required for dual connectivity, and may be configuration information required for data transmission or reception in the MCG or SCG. Otherwise, the configuration information may be configuration information related to the NE-DC processing capability described in the embodiments of the disclosure. As described in the embodiments of the disclosure, the terminal may transmit PDSCH processing capability-related or PUSCH processing capability-related information to the base station before receiving the NE-DC processing capability via a higher layer signal from the base station. The base station may be an NR base station using NR radio access or an E-UTRA base station using E-UTRA radio access.

In operation 1022, the terminal receives uplink transmission configuration information from the base station according to the embodiments proposed by the disclosure, and receives scheduling information indicating uplink transmission. The base station may be an NR base station using NR radio access or an E-UTRA base station using E-UTRA radio access. The uplink transmission configuration information may denote configuration information related to uplink transmission in which transmission is configured by higher layer signal configuration instead of being indicated by the PDCCH, like periodic channel information transmission. Uplink transmission indicated by the scheduling information may denote uplink transmission indicated by the PDCCH and transmitted from the terminal, like PUSCH transmission or HARQ-ACK transmission.

In operation 1023, the terminal transmits uplink transmission to the base station by controlling the transmission power according to the embodiments proposed by the disclosure. Controlling of the transmission power may include dropping uplink transmissions having a low importance or reducing uplink transmission power as described in the embodiments of the disclosure. The base station may be an NR base station using NR radio access or an E-UTRA base station using E-UTRA radio access.

Figure 11:
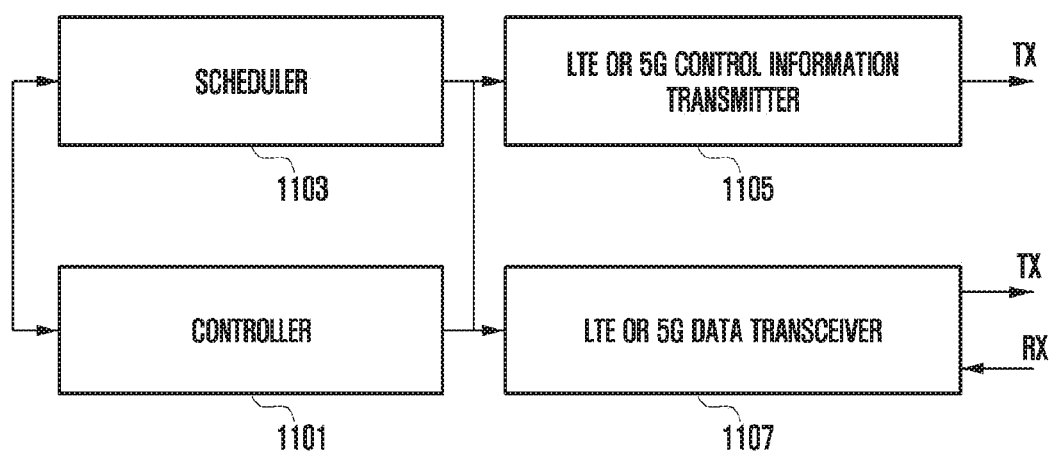
FIG. 11 illustrates a base station device according to embodiments of the disclosure.

FIG. 11 illustrates a base station device according to embodiments proposed by the disclosure.

Figure 7:
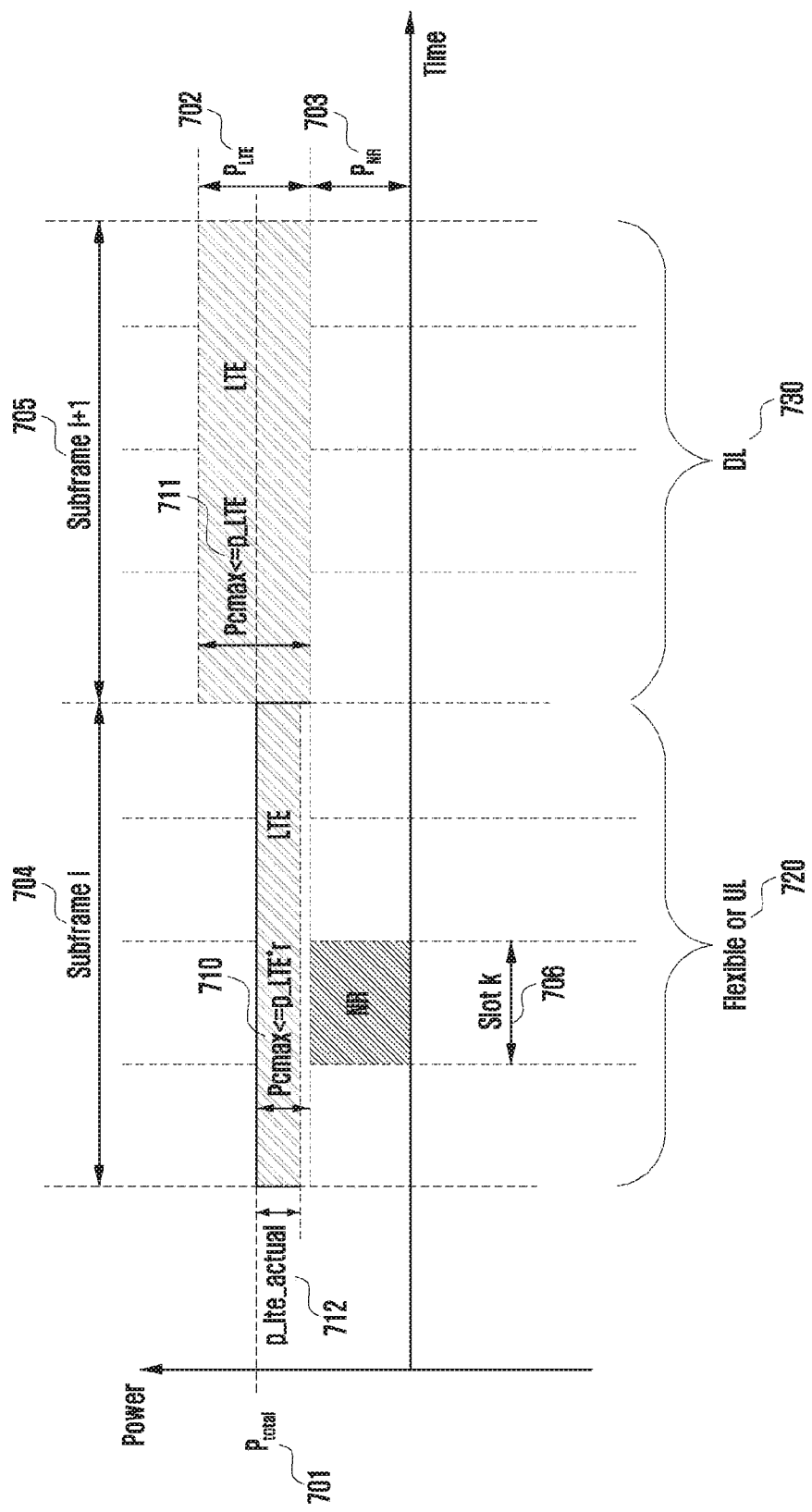
FIG. 7 illustrates a scheme for controlling power of uplink transmission according to embodiment 7 of the disclosure.
Figure 8:
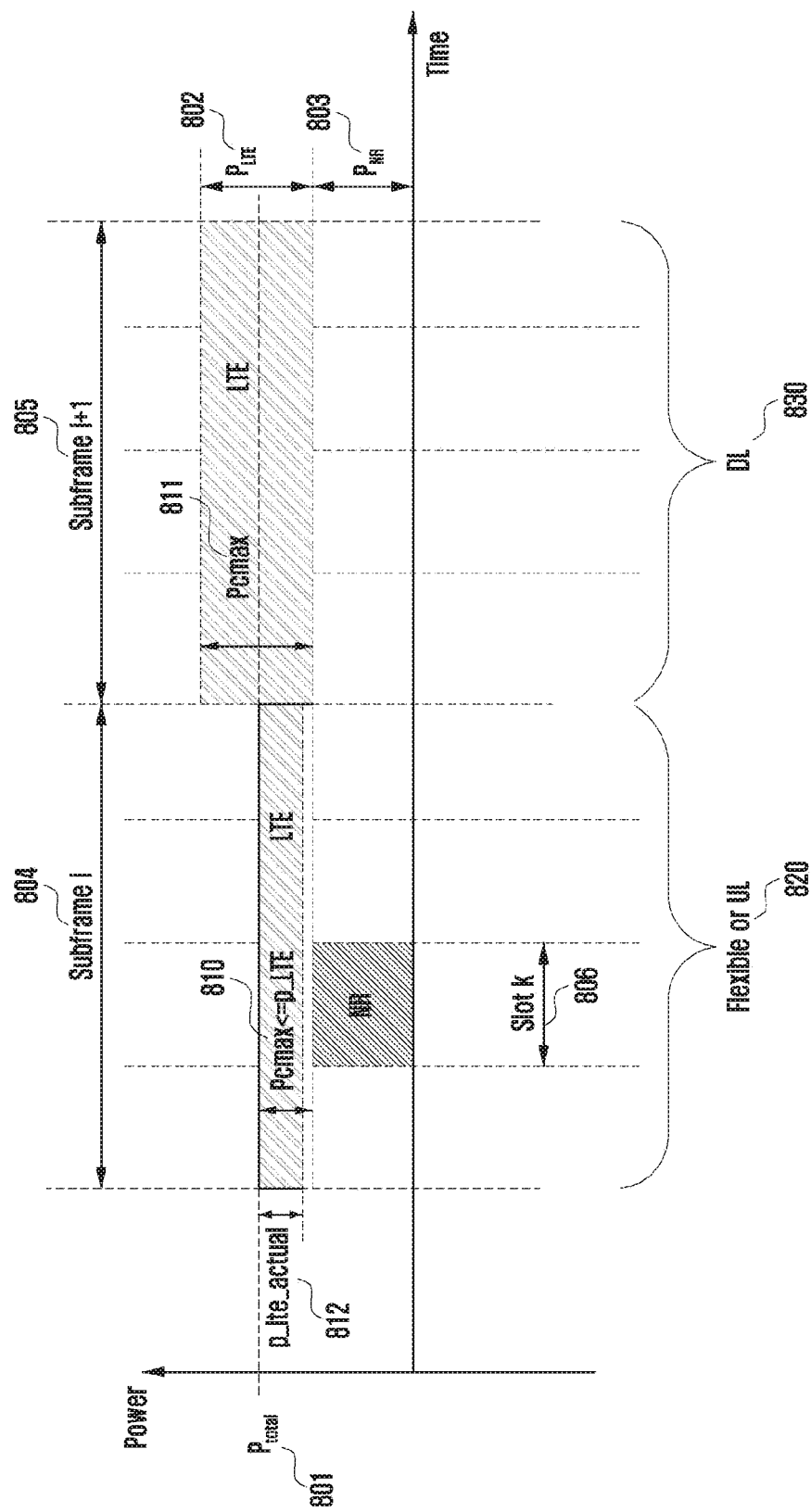
FIG. 8 illustrates a scheme for controlling power of uplink transmission according to embodiment 8 of the disclosure.
Figure 9:
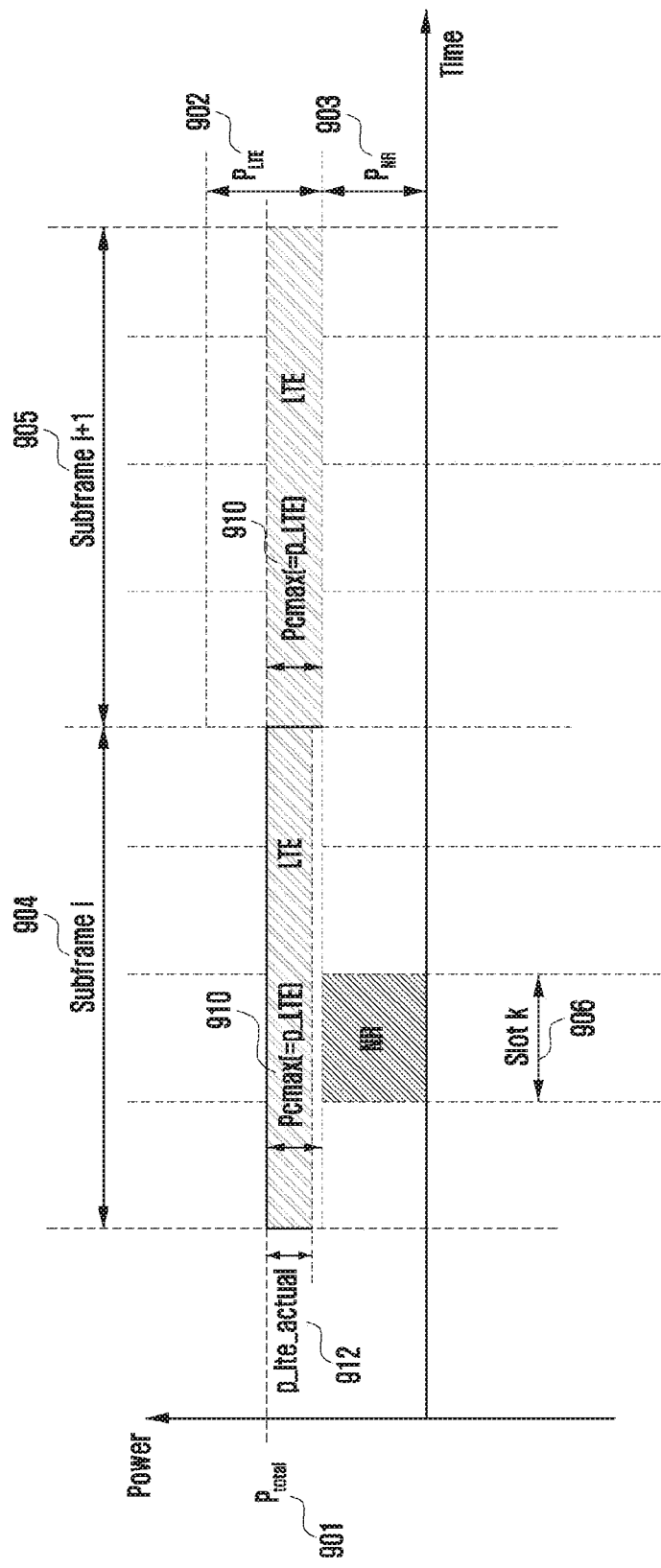
FIG. 9 illustrates a scheme for controlling power of uplink transmission according to embodiment 9 of the disclosure.

A controller 1101 configures necessary information according to the base station procedure according to FIG. 7 of the disclosure and embodiments, and transmits the information to a terminal through an LTE or 5G control information transmitter 1105 and an LTE or 5G data transceiver 1107 by controlling reception of uplink transmission from the terminal according to the disclosure. In addition, the scheduler 1103 schedules LTE or 5G data, and transmits or receives the LTE or 5G data to or from the terminal through the LTE or 5G data transceiver 1107. In the base station device, LTE and 5G are described together for convenience, but the base station device may be an NR base station using NR radio access or an E-UTRA base station using E-UTRA radio access.

Figure 12:
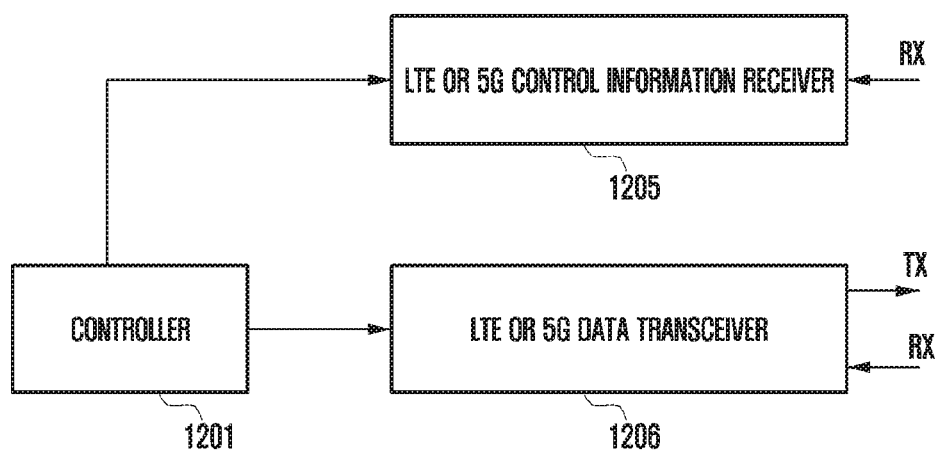
FIG. 12 illustrates a terminal device according to embodiments of the disclosure.

FIG. 12 illustrates a terminal device according to the disclosure.

A terminal device receives, from a base station, necessary configuration information and scheduling according to the terminal procedure according to FIG. 10 of the disclosure and embodiments, and performs uplink transmission, configured by the base station or indicated by scheduling, by controlling uplink transmission power according to the disclosure. The terminal device receives an uplink data channel transmission resource location from the base station through an LTE or 5G control information receiver 1205 and an LTE or 5G data transceiver 1206, and a controller 1201 multiplexes uplink control information and transmits the multiplexed uplink control information to an uplink data channel. In addition, the controller 1201 transmits or receives LTE or 5G data, scheduled at the received resource location, to or from an LTE or 5G base station through the LTE or 5G data transceiver 1206. In FIG. 12, it has been described that devices for LTE and 5G exist together for convenience, but devices for LTE or 5G may be configured separately. The base station for transmitting or receiving the control information and data may be an NR base station using NR radio access, or may be an E-UTRA base station using E-UTRA radio access.

The embodiments of the disclosure described and shown in the specification and the drawings have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

The invention claimed is:

1. A method by a terminal for performing dual connectivity with a first base station based on a first radio access technology and a second base station based on a second radio access technology in a wireless communication system, the method comprising:
receiving, from the first base station, a downlink signal;
identifying whether a transmission timing of a first uplink signal corresponding to the downlink signal overlaps a transmission timing of a second uplink signal which is transmitted to the second base station;
identifying whether a sum of first transmission power for the transmission of the first uplink signal and second transmission power for the transmission of the second uplink signal exceeds a maximum transmission power of the terminal, in case that the transmission timing of the first uplink signal overlaps the transmission timing of the second uplink signal; and
controlling the second transmission power based on a processing time for the transmission of the first uplink signal, in case that the sum exceeds the maximum transmission power of the terminal.

2. The method of claim 1, wherein the processing time includes:
a time for receiving a physical downlink shared channel (PDSCH) or a preparation time for a transmission of a physical uplink shared channel (PUSCH), scheduled by a physical downlink control channel (PDCCH), in case that the downlink signal is the PDCCH; and
a preparation time for transmission of a hybrid automatic repeat and request (HARQ) acknowledgment/negative ack (ACK/NACK) corresponding to the received PDSCH, in case that the downlink signal is the PDSCH.

3. The method of claim 1, wherein the controlling of the second transmission power comprises lowering the maximum transmission power configured for the second base station to a predetermined transmission power value.

4. The method of claim 3, further comprising:
receiving, from the first base station, the predetermined transmission power value,
wherein the first radio access technology is a new radio (NR), and
wherein the second radio access technology is an evolved-universal mobile communication system (UMTS) terrestrial radio access (E-UTRA).

5. A first base station method for supporting dual connectivity for a terminal between the first base station based on a first radio access technology and a second base station based on a second radio access technology in a wireless communication system, the method comprising:
transmitting, to the terminal, a downlink signal; and
receiving, from the terminal, a first uplink signal corresponding to the downlink signal based on first transmission power,
wherein, in case that a transmission timing of the first uplink signal overlaps a transmission timing of a second uplink signal which is transmitted from the terminal to the second base station, and a sum of the first transmission power and second transmission power which is used for the transmission of the second uplink signal exceeds a maximum transmission power of the terminal, second transmission power is controlled based on a processing time of the first uplink signal of the terminal.

6. The method of claim 5, wherein the processing time of the terminal includes:
a time for receiving a physical downlink shared channel (PDSCH) or a preparation time for transmission of a physical uplink shared channel (PUSCH), scheduled by a physical downlink control channel (PDCCH), in case that the downlink signal is the PDCCH; and
a preparation time for a transmission of a hybrid automatic repeat and request (HARQ) acknowledgment/ negative ack (ACK/NACK) corresponding to the received PDSCH, in case that the downlink signal is the PDSCH.

7. The station method of claim 5, wherein the second transmission power is controlled by configuring the maximum transmission power of the second base station, configured for the terminal, to be lowered to a predetermined transmission power value.

8. The base station method of claim 7, further comprising:
transmitting, to the terminal, the predetermined transmission power value,
wherein the first radio access technology is a new radio (NR), and
wherein the second radio access technology is an evolved-universal mobile communication system (UMTS) terrestrial radio access (E-UTRA).

9. A terminal for performing dual connectivity with a first base station based on a first radio access technology and a second base station based on a second radio access technology in a wireless communication system, the terminal comprising:
- a transceiver; and
- a controller configured to:
- control the transceiver to receive, from the first base station, a downlink signal;
- identify whether a first time resource for a transmission of a first uplink signal corresponding to the downlink signal overlaps a second time resource for a transmission of a second uplink signal which is transmitted to the second base station;
- identify whether a sum of first transmission power for the transmission of the first uplink signal and second transmission power for the transmission of the second uplink signal exceeds a maximum transmission power of the terminal, in case that the transmission timing of the first uplink signal overlaps the transmission timing of the second uplink signal; and
- control the second transmission power based on a processing time for the transmission of the first uplink signal, in case that the sum exceeds the maximum transmission power of the terminal.

10. The terminal of claim 9, wherein the processing time includes:
- a time for receiving a physical downlink shared channel (PDSCH) or a preparation time for a transmission of a physical uplink shared channel (PUSCH), scheduled by a physical downlink control channel (PDCCH), in case that the downlink signal is the PDCCH; and
- a preparation time for transmission of a hybrid automatic repeat and request (HARQ) acknowledgment/negative ack (ACK/NACK) corresponding to the received PDSCH, in case that the downlink signal is the PDSCH.

11. The terminal of claim 9, wherein the controller is configured to: lower the maximum transmission power configured for the second base station to a predetermined transmission power value; and control the second transmission power based on the predetermined transmission power value.

12. The terminal of claim 11, wherein the controller is configured to control the transceiver to receive, from the first base station, the predetermined transmission power value,
- wherein the first radio access technology is a new radio (NR), and
- wherein the second radio access technology is an evolved-universal mobile communication system (UMTS) terrestrial radio access (E-UTRA).

13. A first base station for supporting dual connectivity for a terminal between the first base station based on a first radio access technology and a second base station based on a second radio access technology in a wireless communication system, the first base station comprising:
- a transceiver; and
- a controller configured to:
- control the transceiver to transmit, to the terminal, a downlink signal, and
- control the transceiver to receive, from the terminal, a first uplink signal corresponding to the downlink signal based on first transmission power,
- wherein, in case that a transmission timing of the first uplink signal overlaps a transmission timing of a second uplink signal which is transmitted from the terminal to the second base station, and a sum of the first transmission power and second transmission power which is used for the transmission of the second uplink signal exceeds a maximum transmission power of the terminal, second transmission power is controlled based on a processing time of the first uplink signal of the terminal.

14. The first base station of claim 13, wherein the processing time of the terminal includes:
- a time for receiving a physical downlink shared channel (PDSCH) or a preparation time for transmission of a physical uplink shared channel (PUSCH), scheduled by a physical downlink control channel (PDCCH), in case that the downlink signal is the PDCCH; and
- a preparation time for a transmission of a hybrid automatic repeat and request (HARQ) acknowledgment/negative ack (ACK/NACK) corresponding to the received PDSCH, in case that the downlink signal is the PDSCH.

15. The first base station of claim 13, wherein the controller is configured to control the transceiver to transmit, to the terminal, the predetermined transmission power value,
- wherein the second transmission power is controlled by configuring the maximum transmission power of the second base station, configured for the terminal, to be lowered to a predetermined transmission power value,
- wherein the first radio access technology is a new radio (NR), and
- wherein the second radio access technology is an evolved-universal mobile communication system (UMTS) terrestrial radio access (E-UTRA).

* * * * *